US009910521B2

(12) United States Patent
Ahn et al.

(10) Patent No.: US 9,910,521 B2
(45) Date of Patent: Mar. 6, 2018

(54) CONTROL APPARATUS FOR MOBILE TERMINAL AND CONTROL METHOD THEREOF

(71) Applicant: LG ELECTRONICS INC., Seoul (KR)

(72) Inventors: Yeongnam Ahn, Seoul (KR); Yoonji Moon, Seoul (KR); Egun Jung, Seoul (KR); Haein Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 546 days.

(21) Appl. No.: 14/500,679

(22) Filed: Sep. 29, 2014

(65) Prior Publication Data
US 2015/0095826 A1 Apr. 2, 2015

(30) Foreign Application Priority Data

Oct. 1, 2013 (KR) .................. 10-2013-0117534
Oct. 31, 2013 (KR) .................. 10-2013-0131455

(51) Int. Cl.
*G06F 3/041* (2006.01)
*G06F 3/0488* (2013.01)
(Continued)

(52) U.S. Cl.
CPC .......... *G06F 3/0412* (2013.01); *G06F 1/1626* (2013.01); *G06F 1/1643* (2013.01); *G06F 1/1647* (2013.01); *G06F 3/0482* (2013.01); *G06F 3/0486* (2013.01); *G06F 3/0488* (2013.01); *G06F 3/04817* (2013.01);
(Continued)

(58) Field of Classification Search
CPC ............................ G06F 3/0412; G06F 3/0488
See application file for complete search history.

(56) References Cited

U.S. PATENT DOCUMENTS 7,912,508 B2\* 3/2011 Lee ..................... H04M 1/0266
455/566
2006/0123353 A1\* 6/2006 Matthews ............. G06F 3/0481
715/779
(Continued)

OTHER PUBLICATIONS

PCT International Application No. PCT/KR2014/009123, Written Opinion of the International Searching Authority dated Jan. 19, 2015, 10 pages.

*Primary Examiner* — Ryan Barrett
(74) *Attorney, Agent, or Firm* — Lee, Hong, Degerman, Kang & Waimey

(57) ABSTRACT

This specification relates to a control apparatus for a mobile terminal, capable of checking information through first and/or second sub display(s) in an easy, convenient manner, and a control method thereof. The control apparatus includes a main display that is located on a front surface of the mobile terminal, a first sub display that extends from the main display and is located on the left of the mobile terminal, a second sub display that extends from the main display and is located on the right of the mobile terminal, a communication unit that is configured to receive event information, and a controller that is configured to generate indication information indicating that the event information has been received, and output the indication information on the first or second sub display while the mobile terminal is gripped by a user.

19 Claims, 23 Drawing Sheets

(51) Int. Cl.
*G06F 3/0484* (2013.01)
*G06F 3/0486* (2013.01)
*G06F 3/0481* (2013.01)
*G06F 3/0482* (2013.01)
*G06F 1/16* (2006.01)
*H04M 1/02* (2006.01)
*H04M 1/725* (2006.01)

(52) U.S. Cl.
CPC ...... *G06F 3/04847* (2013.01); *H04M 1/0268* (2013.01); *H04M 1/72583* (2013.01); *H04M 2250/16* (2013.01); *H04M 2250/22* (2013.01)

(56) References Cited

U.S. PATENT DOCUMENTS

| | | | | |
|---|---|---|---|---|
| 2006/0197750 A1* | 9/2006 | Kerr | G06F 1/1626 | 345/173 |
| 2007/0234226 A1* | 10/2007 | Szeto | G06F 3/0486 | 715/769 |
| 2008/0227507 A1 | 9/2008 | Seok | | |
| 2010/0081475 A1* | 4/2010 | Chiang | G06F 3/0483 | 455/564 |
| 2010/0141605 A1* | 6/2010 | Kang | G06F 1/1626 | 345/174 |
| 2010/0156887 A1* | 6/2010 | Lindroos | G06F 1/1626 | 345/418 |
| 2010/0208065 A1* | 8/2010 | Heiner | G06F 3/011 | 348/143 |
| 2010/0216514 A1* | 8/2010 | Smoyer | G06F 1/1647 | 455/566 |
| 2011/0148915 A1* | 6/2011 | Kim | G06F 1/1626 | 345/619 |
| 2012/0046077 A1* | 2/2012 | Kim | H04M 1/72577 | 455/566 |
| 2012/0066591 A1* | 3/2012 | Hackwell | G06F 3/0483 | 715/702 |
| 2012/0096373 A1* | 4/2012 | Aguera y Arcas | G06F 1/1645 | 715/764 |
| 2013/0002133 A1 | 1/2013 | Jin et al. | | |
| 2013/0033434 A1* | 2/2013 | Richardson | G06F 3/0488 | 345/173 |
| 2013/0076649 A1* | 3/2013 | Myers | H04M 1/0268 | 345/173 |
| 2013/0145311 A1* | 6/2013 | Joo | G06F 3/04886 | 715/788 |
| 2013/0178248 A1* | 7/2013 | Kim | H04M 1/0268 | 455/566 |
| 2013/0222287 A1 | 8/2013 | Bae et al. | | |
| 2013/0300697 A1* | 11/2013 | Kim | G06F 1/1626 | 345/173 |
| 2014/0118271 A1* | 5/2014 | Lee | G06F 3/0488 | 345/173 |
| 2014/0132481 A1* | 5/2014 | Bell | H05K 5/0017 | 345/1.3 |
| 2014/0247405 A1* | 9/2014 | Jin | H01L 51/524 | 349/12 |
| 2014/0320435 A1* | 10/2014 | Modarres | G06F 3/0412 | 345/173 |
| 2015/0015511 A1* | 1/2015 | Kwak | G06F 3/0416 | 345/173 |
| 2015/0015512 A1* | 1/2015 | Kwak | G06F 3/0416 | 345/173 |
| 2015/0015513 A1* | 1/2015 | Kwak | G06F 3/0416 | 345/173 |
| 2015/0031417 A1* | 1/2015 | Lee | H04M 1/72519 | 455/566 |
| 2015/0138046 A1* | 5/2015 | Moon | G06F 3/0416 | 345/7 |
| 2015/0143238 A1* | 5/2015 | Jung | G06F 3/04817 | 715/708 |
| 2015/0242006 A1* | 8/2015 | Kim | G06F 1/1626 | 345/173 |
| 2015/0248200 A1* | 9/2015 | Cho | G06F 3/0482 | 715/773 |
| 2015/0331451 A1* | 11/2015 | Shin | G06F 3/041 | 345/173 |
| 2015/0334211 A1* | 11/2015 | Shin | G06F 3/041 | 455/566 |
| 2015/0339804 A1* | 11/2015 | Kim | G06F 3/04886 | 345/659 |
| 2015/0346899 A1* | 12/2015 | Jung | G06F 3/0416 | 345/173 |
| 2015/0379964 A1* | 12/2015 | Lee | G09G 5/12 | 345/173 |
| 2016/0006862 A1* | 1/2016 | Park | H04M 1/72577 | 455/411 |
| 2016/0041716 A1* | 2/2016 | Richardson | G06F 3/0488 | 345/173 |
| 2016/0066412 A1* | 3/2016 | Choi | G06F 1/1626 | 361/704 |
| 2016/0066440 A1* | 3/2016 | Choi | G06F 1/1637 | 361/679.3 |
| 2016/0117994 A1* | 4/2016 | Lee | G09G 3/3406 | 345/694 |
| 2016/0132207 A1* | 5/2016 | Moon | G06F 3/0416 | 715/863 |
| 2016/0179229 A1* | 6/2016 | Ahn | G06F 3/041 | 345/173 |
| 2016/0195900 A1* | 7/2016 | Shin | G06F 3/041 | 455/566 |
| 2016/0246375 A1* | 8/2016 | Rihn | G06F 3/016 | |
| 2016/0253039 A1* | 9/2016 | Heo | G06F 3/0412 | |
| 2016/0309017 A1* | 10/2016 | Lee | H04M 1/72519 | |
| 2017/0083148 A1* | 3/2017 | Ahn | H04M 1/7253 | |

\* cited by examiner

CONTROL APPARATUS FOR MOBILE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Application Nos. 10-2013-0117534, filed on Oct. 1, 2013, and 10-2013-0131455, filed on Oct. 31, 2013, the contents of which are all hereby incorporated by reference herein in their entirety.

BACKGROUND OF THE DISCLOSURE

1. Field of the Disclosure

This specification relates to a control apparatus for a mobile terminal and a control method thereof.

2. Background of the Disclosure

In general, a touch screen of a mobile terminal refers to an input device which is applied to a display such that buttons displayed thereon are touched to manipulate the terminal. That is, the touch screen refers to a display device which is designed such that when a user directly touches the touch screen using a finger or a pen-shaped touch tool, a device having the screen recognizes the touched portion and accordingly executes a corresponding command or moves a position of a cursor.

SUMMARY OF THE DISCLOSURE

To achieve these and other advantages and in accordance with the purpose of this specification, as embodied and broadly described herein, there is provided a control apparatus for a mobile terminal, the apparatus including a main display that is located on a front surface of the mobile terminal, a first sub display that extends from the main display and is located on the left of the mobile terminal, a second sub display that extends from the main display and is located on the right of the mobile terminal, a communication unit that is configured to receive event information, and a controller that is configured to generate indication information indicating that the event information has been received, and output the indication information on the first or second sub display while the mobile terminal is gripped by a user.

In accordance with one embodiment disclosed herein, the controller may output the indication information on the first sub display when the number of touch inputs applied to the first sub display is smaller than the number of touch inputs applied to the second sub display while the mobile terminal is gripped.

In accordance with one embodiment disclosed herein, the controller may output the indication information on the second sub display when the number of touch inputs applied to the second sub display is smaller than the number of touch inputs applied to the first sub display while the mobile terminal is gripped.

In accordance with one embodiment disclosed herein, the controller may output the indication information on the first or second sub display according to a posture of the mobile terminal.

In accordance with one embodiment disclosed herein, the controller may output the indication information on the first or second sub display when the main display of the mobile terminal faces the direction of gravity.

In accordance with one embodiment disclosed herein, the controller may detect a user direction and output the indication information on the first or second sub display according to the detected user direction.

In accordance with one embodiment disclosed herein, the control apparatus may further include a first directional microphone that is configured to receive a first sound received in a direction of the first sub display, and a second directional microphone that is configured to receive a second sound received in a direction of the second sub display. The controller may output the indication information on the first sub display by recognizing that the user is located in the direction of the first sub display when a preset user voice is recognized from the first sound of the first and second sounds, and output the indication information on the second sub display by recognizing that the user is located in the direction of the second sub display when the preset user voice is recognized from the second sound of the first and second sounds.

In accordance with one embodiment disclosed herein, the controller may output the event information corresponding to the indication information on the main display when the indication information displayed on the first or second sub display is dragged into the main display.

In accordance with one embodiment disclosed herein, the controller may display contents on the main display, and display icons indicating application programs for processing the contents on the first or second sub display, wherein the controller may execute an application program corresponding to one of the icons to process the contents when the contents are moved to the one icon through drag & drop.

In accordance with one embodiment disclosed herein, the controller may display contents on the main display, and display a first icon indicating an application program for processing the contents on the first sub display. The controller may also display a second icon for transmitting the contents to a preset recipient on the second sub display, and transmit the contents to the recipient corresponding to the second icon through an application program cooperative with the second icon when the contents are moved to the second icon through drag & drop.

To achieve these and other advantages and in accordance with the purpose of this specification, as embodied and broadly described herein, there is provided a control method for a mobile terminal, in a method of controlling the mobile terminal comprising a main display that is located on a front surface of the mobile terminal, a first sub display that extends from the main display and is located on the left of the mobile terminal, and a second sub display that extends from the main display and is located on the right of the mobile terminal, the method including receiving event information through a wireless communication network, generating indication information indicating that the event information has been received, and displaying the indication information on the first or second sub display while the mobile terminal is gripped by a user.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
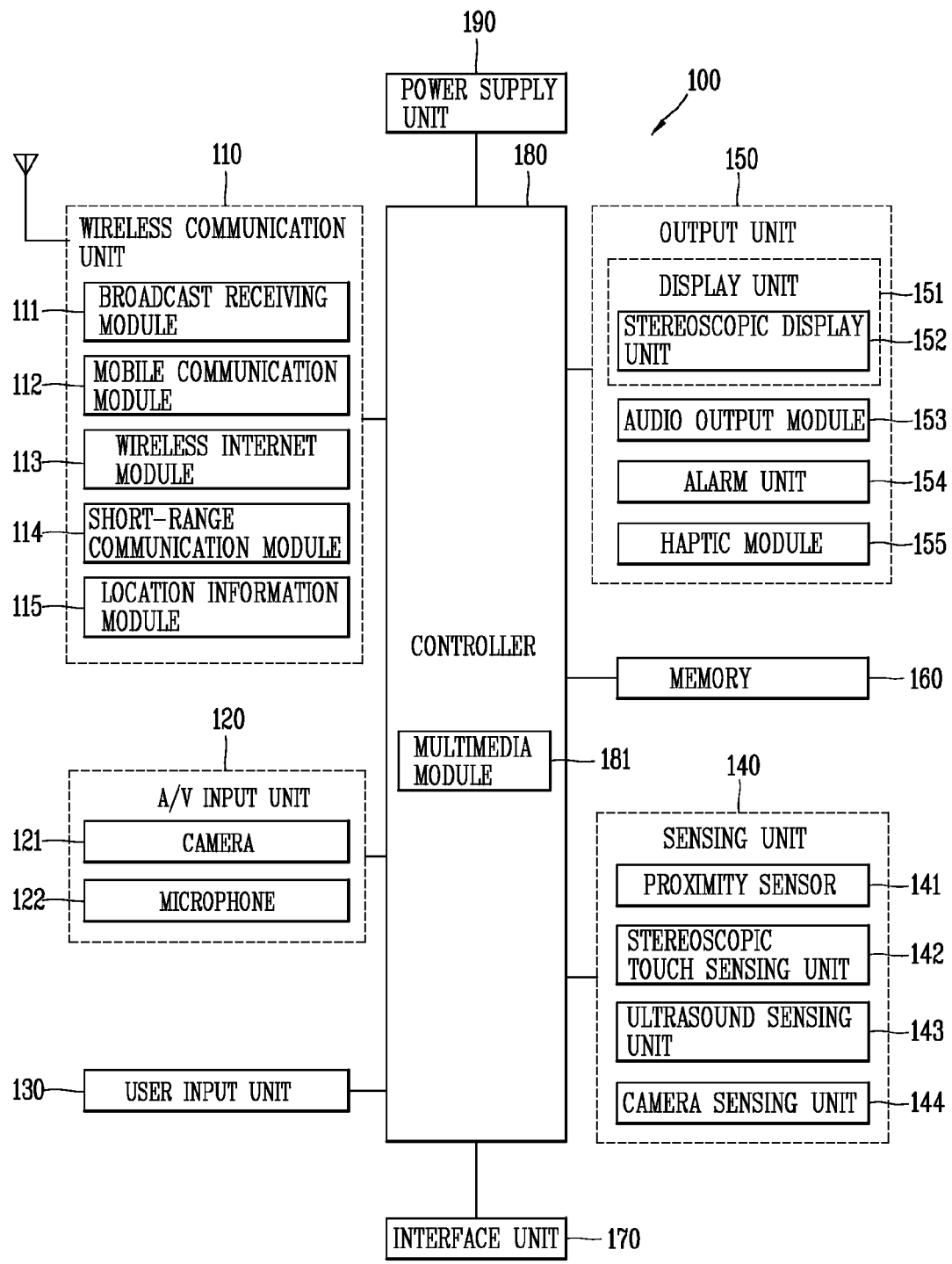
FIG. 1 is a block diagram of a mobile terminal for illustrating exemplary embodiments of the present disclosure.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly.

Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted. Also, it should be noted that the accompanying drawings are merely illustrated to easily explain the spirit of the invention, and therefore, they should not be construed to limit the spirit of the invention by the accompanying drawings.

Mobile terminals disclosed herein may be implemented using a variety of different types of terminals. Examples of such terminals include mobile terminals, such as mobile phones, smart phones, laptop computers, digital broadcast terminals, Personal Digital Assistants (PDA), Portable Multimedia Players (PMP), navigators, slate PCs, table PCs, ultrabooks, and the like.

FIG. 1 is a block diagram of a mobile terminal for illustrating exemplary embodiments of the present disclosure.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of a digital multimedia broadcasting (DMB) system, an electronic service guide (ESG) of a digital video broadcast-handheld (DVB-H) system, and the like.

The broadcast receiving module 111 may receive a digital broadcast by using a digital broadcast system such as a multimedia broadcasting-terrestrial (DMB-T) system, a digital multimedia broadcasting-satellite (DMB-S) system, a data broadcasting system such as media forward link only (MediaFLO®), a digital video broadcast-handheld (DVB-H) system, integrated services digital broadcast-terrestrial (ISDB-T), etc. The broadcast receiving module 111 may be configured to be suitable for additional broadcast systems that provide a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 may transmit/receive wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The mobile communication module 112 may implement a video (telephony) call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless internet module 113 may support wireless Internet access for the mobile terminal. This module may be internally or externally coupled to the mobile terminal. Examples of such wireless Internet access may include Wireless LAN (WLAN), Wi-Fi, Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, Near Field Communication (NFC) and the like.

The location information module 115 denotes a module for detecting or calculating a position of the mobile terminal. An example of the location information module 115 may include a Global Position System (GPS) module or a WiFi module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Position information related to a user and the like may be extracted from the image frame obtained from the camera 121. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or the like. This audio signal is processed into electric audio data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch and the like.

The sensing unit 140 may provide status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device, and the like.

The output unit 150 is configured to output an audio signal, a video signal or an alarm signal. The output unit 150 may include a display 151, an audio output module 153, an alarm 155, and the like.

The display unit 151 may output information processed in the mobile terminal 100. For example, when the mobile terminal is operating in a phone call mode, the display unit 151 may provide a User Interface (UI) or a Graphic User Interface (GUI), which includes information associated with the call. As another example, if the mobile terminal is in a video call mode or a capture mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display and the like.

Some of such displays may be implemented as a transparent type or an optical transparent type through which the exterior is visible, which is referred to as a transparent display. A representative example of the transparent display may include a Transparent OLED (TOLED), or the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may also be implemented as a stereoscopic display unit 152 for displaying stereoscopic images. Here, the stereoscopic image may be a three-dimensional (3D) stereoscopic image. The 3D stereoscopic image refers to an image making a viewer feel that a gradual depth and reality of an object on a monitor or a screen is the same as a realistic space. The 3D stereoscopic image may be implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, may include Wheatstone stereoscopic scheme, or the like.

The auto-stereoscopic scheme may include, for example, a parallax barrier scheme, a lenticular scheme, an integral imaging scheme, a switchable lens, or the like. The projection scheme may include a reflective holographic scheme, a transmissive holographic scheme, and the like.

In general, a 3D stereoscopic image may be comprised of a left image (a left eye image) and a right image (a right eye image). According to how left and right images are combined into a 3D stereoscopic image, a 3D stereoscopic imaging method may be divided into a top-down method in which left and right images are disposed up and down in a frame, an L-to-R (left-to-right or side by side) method in which left and right images are disposed left and right in a frame, a checker board method in which fragments of left and right images are disposed in a tile form, an interlaced method in which left and right images are alternately disposed by columns or rows, and a time sequential (or frame by frame) method in which left and right images are alternately displayed on a time basis.

Also, as for a 3D thumbnail image, a left image thumbnail and a right image thumbnail may be generated from a left image and a right image of an original image frame, respectively, and then combined to generate a single 3D thumbnail image. In general, thumbnail refers to a reduced image or a reduced still image. The thusly generated left image thumbnail and the right image thumbnail may be displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a 'touch sensor') have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched.

Still referring to FIG. 1, a proximity sensor 141 may be arranged at an inner region of the mobile terminal covered by the touch screen, or near the touch screen. The proximity sensor 141 may be provided as one example of the sensing unit 140. The proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen may be sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position will correspond to a position where the pointer faces perpendicular to the touch screen upon the proximity touch of the pointer.

The proximity sensor 141 may sense proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as a 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144. The proximity sensor 141 may detect the distance between a sensing object (for example, the user's finger or a stylus pen), applying a touch by using the force of electromagnetism or infrared rays without a mechanical contact, and a detect surface. By using the distance, the terminal may recognize which portion of a stereoscopic image has been touched. In particular, when the touch screen is an electrostatic touch screen, the degree of proximity of the sensing object may be detected based on a change of an electric field according to proximity of the sensing object, and a touch to the 3D image may be recognized by using the degree of proximity.

The stereoscopic touch sensing unit 142 may be configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 may be configured to recognize position information relating to the sensing object by using ultrasonic waves.

The ultrasonic sensing unit 143 may include, for example, an optical sensor and a plurality of ultrasonic sensors. The optical sensor may be configured to sense light and the ultrasonic sensors may be configured to sense ultrasonic waves. Since light is much faster than ultrasonic waves, a time for which the light reaches the optical sensor may be much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 may include at least one of the camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor may be configured to scan a movement of the sensing object in proximity to the touch screen. In more detail, the photo sensor may include photo diodes and transistors at rows and columns to scan content mounted on the photo sensor by using an electrical signal changing according to the quantity of applied light. Namely, the photo sensor may calculate the coordinates of the sensing object according to variation of light to thus obtain position information of the sensing object.

The audio output module 153 may output audio data received from the wireless communication unit 110 or stored in the memory 160 in a call signal reception mode, a call mode, a record mode, a voice recognition mode, a broadcast reception mode, and the like. Also, the audio output module 153 may provide audible output signals related to a particular function (e.g., a call signal reception sound, a message reception sound, etc.) performed by the mobile terminal 100. The audio output module 153 may include a receiver, a speaker, a buzzer or the like.

The alarm unit 154 may output a signal for informing about an occurrence of an event of the mobile terminal 100. Events generated in the mobile terminal, for example, may include call signal reception, message reception, key signal inputs, a touch input, etc. In addition to video or audio signals, the alarm unit 154 may output signals in a different manner, for example, using vibration to inform of an occurrence of an event. The video or audio signals may also be output via the display unit 151 and the audio output module 153. Hence, the display unit 151 and the audio output module 153 may be classified as parts of the alarm unit 154.

A haptic module 155 may generate various tactile effects that user may feel. A typical example of the tactile effect generated by the haptic module 155 is vibration. Strength, pattern and the like of the vibration generated by the haptic module 155 may be controllable by a user selection or setting of the controller. For example, different vibrations may be combined to be outputted or sequentially outputted.

Besides vibration, the haptic module 155 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 155 may be implemented to allow the user to feel a tactile effect through a muscle sensation such as the user's fingers or arm, as well as transferring the tactile effect through a direct contact. Two or more haptic modules 155 may be provided according to the configuration of the mobile terminal 100.

The memory 160 may store programs used for operations performed by the controller, or may temporarily store input and/or output data (for example, a phonebook, messages, still images, video, etc.). In addition, the memory 160 may store data regarding various patterns of vibrations and audio signals output when a touch input is sensed on the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 may serve as an interface with every external device connected with the mobile terminal 100. For example, the interface unit 170 may receive data transmitted from an external device, receive power to transfer to each element within the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 may typically control the general operations of the mobile terminal 100. For example, the controller 180 may perform controlling and processing associated with voice calls, data communications, video calls, and the like. The controller 180 may include a multimedia module 181 for playbacking multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 may receive external power or internal power and supply appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2A:
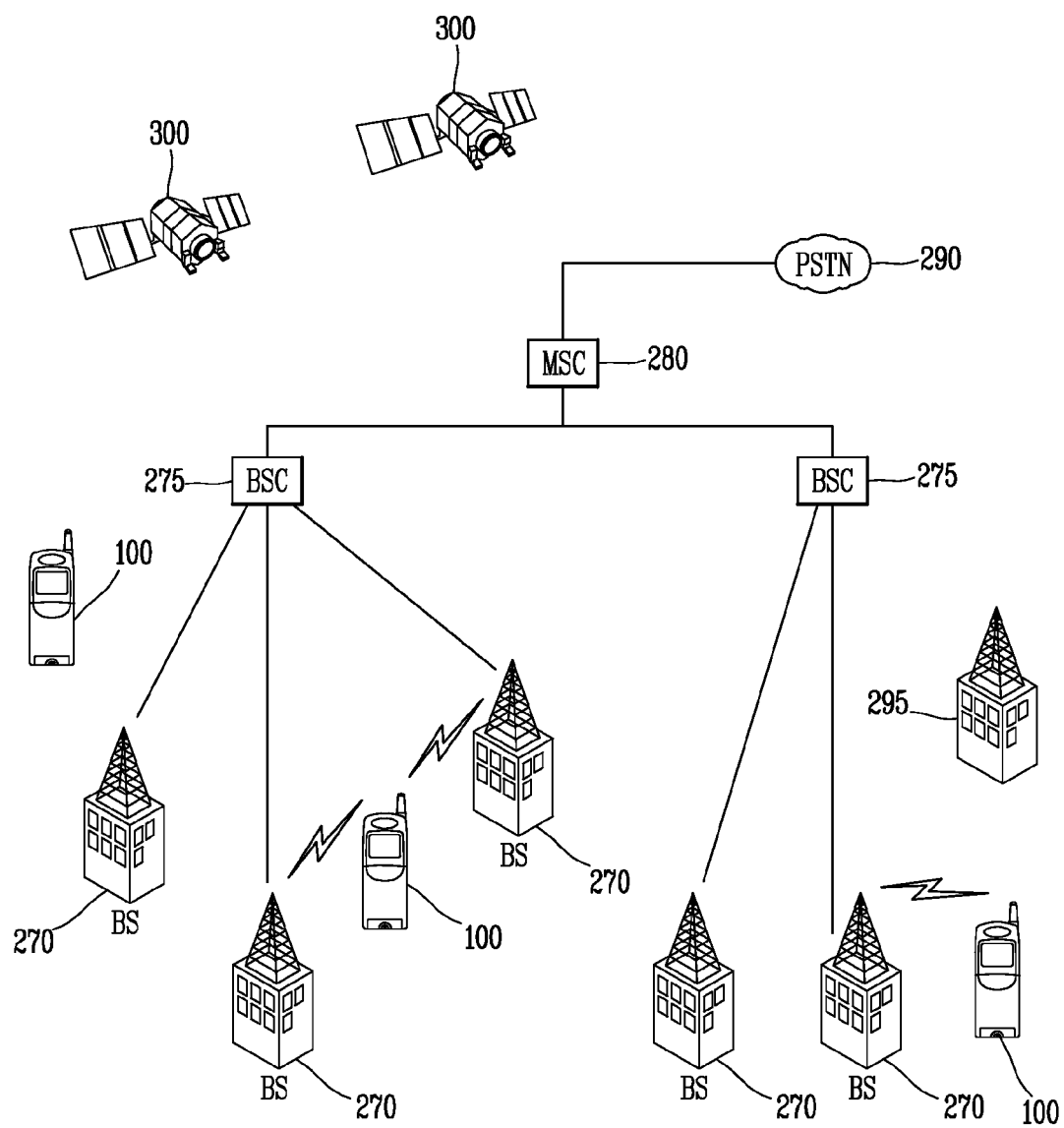
FIGS. 2A and 2B are conceptual views of a communication system operable with a mobile terminal in accordance according to the present disclosure.
Figure 2B:
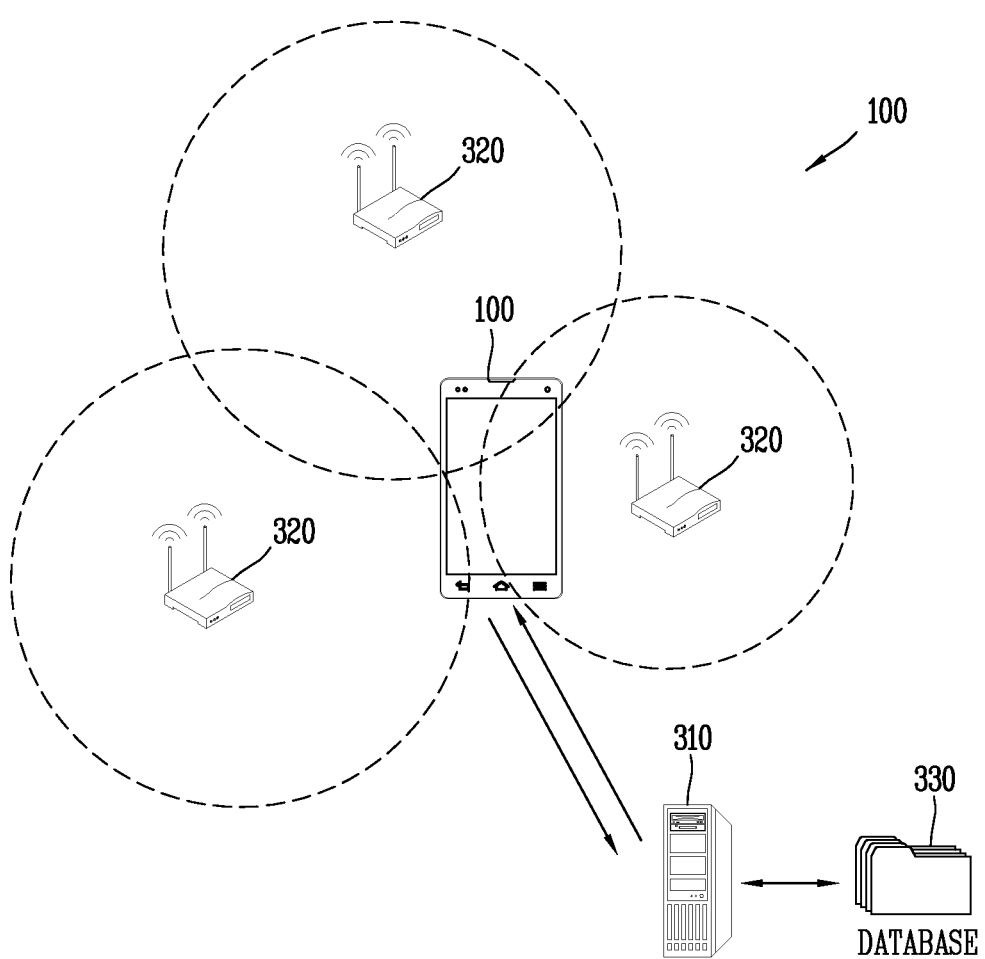

Hereinafter, description will be given of a communication system operable with a mobile terminal according to the present disclosure. FIGS. 2A and 2B are conceptual views of a communication system operable with a mobile terminal 100 disclosed herein.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1) is typically configured inside the mobile terminal 100 to receive broadcast signals transmitted by the BT 295.

Referring to FIG. 2A, a broadcasting transmitter (BT) 295 may transmit a broadcast signal to terminals operating within the system. The broadcasting reception module 111 illustrated in FIG. 1 may be provided in the terminal for receiving the broadcasting signal transmitted from the BT 295.

FIG. 2A further depicts several Global Positioning System (GPS) satellites 300. Such satellites 300 facilitate locating the position of at least one of plural mobile terminals 100. Two satellites are depicted in FIG. 2A, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method of obtaining location information relating to a mobile terminal using a WiFi positioning system with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point (AP) 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 may extract the information of the wireless AP 320 connected to the mobile terminal 100 based on a location information request message (or signal) of the mobile terminal 100. Information related to the wireless AP 320 may be transmitted to the WiFi location determination server 310 through the mobile terminal 100 or transmitted to the WiFi location determination server 310 from the wireless AP 320.

The information related to the wireless AP extracted based on the location information request message of the mobile terminal 100 may be at least one of MAC address, SSID, RSSI, channel information, privacy, network type, signal strength and noise strength.

The WiFi location determination server 310 may receive the information of the wireless AP 320 connected to the mobile terminal 100 as described above, and compare the received wireless AP 320 information with information contained in the pre-established database 330 to extract (or analyze) the location information of the mobile terminal 100.

On the other hand, referring to FIG. 2B, as an example, wireless APs connected to the mobile terminal 100 are illustrated as first, second, and third wireless APs 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information related to any wireless APs disposed at different locations may be stored in the database 330.

The information related to any wireless APs stored in the database 330 may be information such as MAC address, SSID, RSSI, channel information, privacy, network type, latitude and longitude coordinates of the wireless AP, building at which the wireless AP is located, floor number, detailed indoor location information (GPS coordinates available), AP owner's address, phone number, and the like.

In this manner, any wireless AP information and location information corresponding to the any wireless AP may be stored together in the database 330, and thus the WiFi location determination server 310 may retrieve wireless AP information corresponding to the information related to the wireless AP 320 connected to the mobile terminal 100 from the database 330 and extract the location information matched to the retrieved wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, description will be given of a control apparatus for a mobile terminal, capable of recognizing a gripped state when a user grips a mobile terminal 100, and a control method thereof.

Figure 3A:
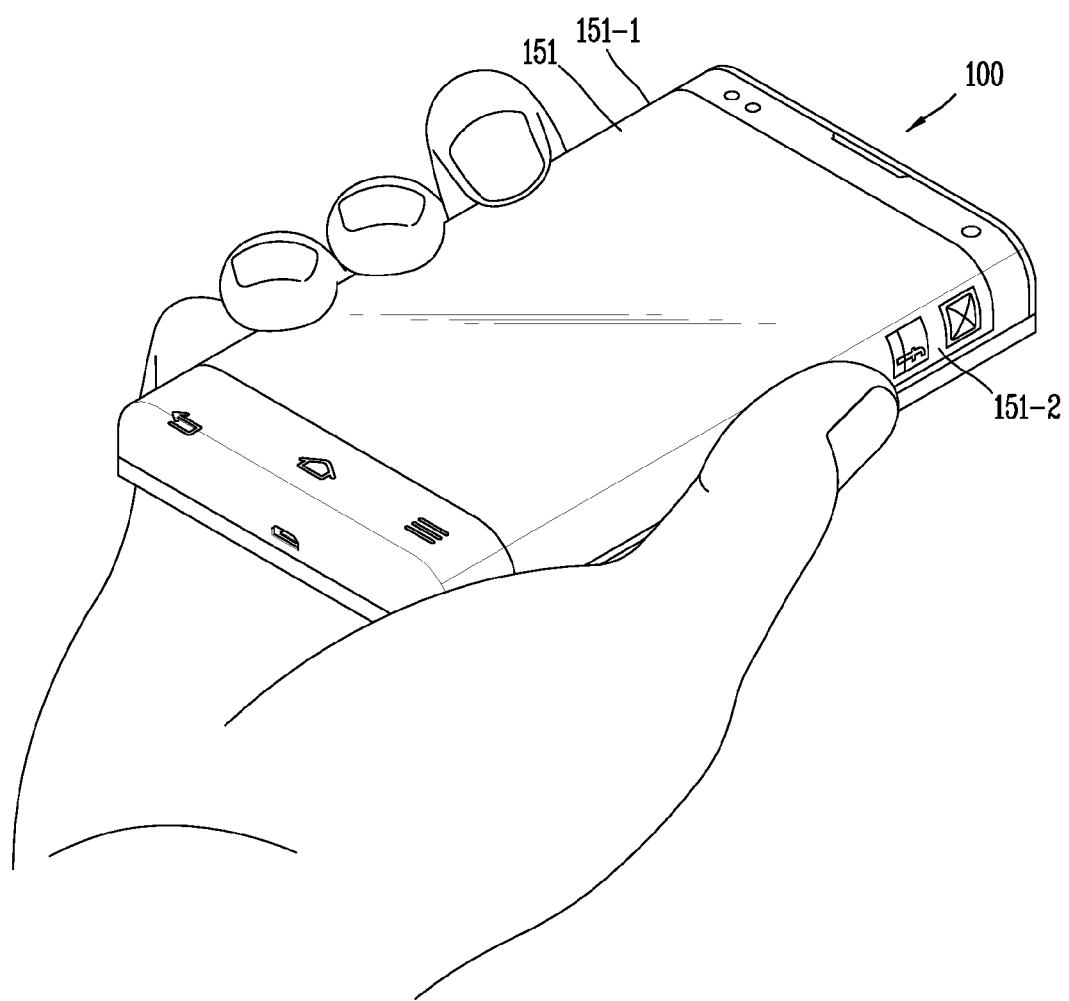
FIG. 3A is an exemplary view illustrating a state where a mobile terminal is gripped by a user.

FIG. 3A is an exemplary view illustrating a state where a mobile terminal is gripped by a user.

As illustrated in FIG. 3A, when the user grips the mobile terminal 100, a bezel area of a touch screen is touched by the user.

Figure 3B:
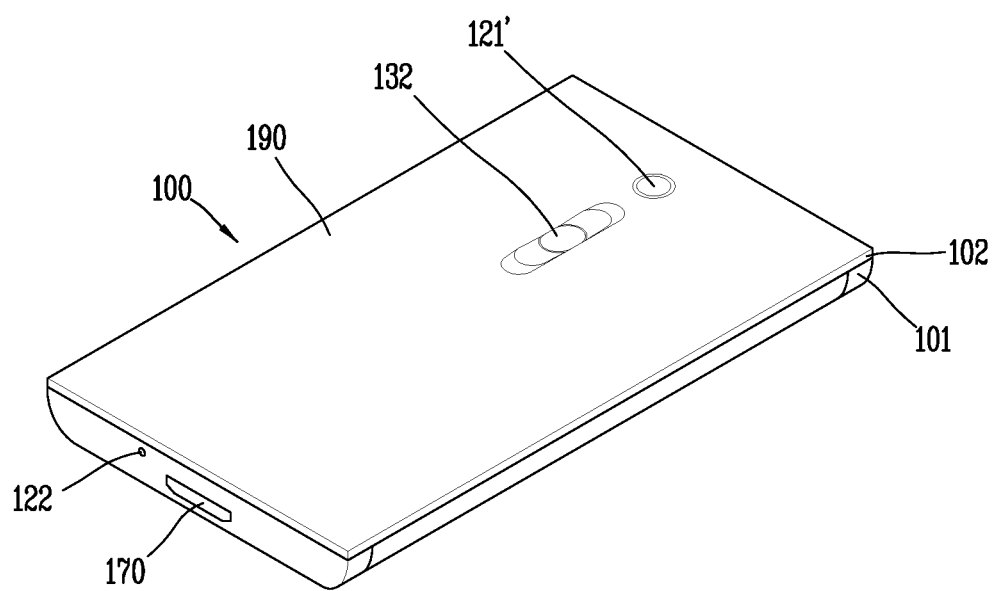
FIG. 3B is a rear perspective view of the mobile terminal illustrated in FIG. 3A.

FIG. 3B is a rear perspective view of the mobile terminal 100 illustrated in FIG. 3A. The mobile terminal 100 is provided with a banded display only phone (DOP)-type body in which the display unit 151 extends up to side surfaces of the terminal body.

The body may include a case (casing, housing, cover, etc.) forming the appearance of the terminal. In this embodiment, the case may be divided into a front case 101 and a rear case 102. Various electronic components are incorporated into a space formed between the front case 101 and the rear case 102. At least one intermediate case may be additionally disposed between the front case 101 and the rear case 102.

The cases may be formed by injection-molding synthetic resin or may be formed of a metal, for example, stainless steel (STS), titanium (Ti), or the like.

A display unit 151, an audio output module 152, a camera module 121 and the like may be disposed on the terminal body, generally on the front case 101, and an interface unit 170 and the like may be provided on lateral surfaces of the front case 101 and the rear case 102. The display unit 151 may occupy a most portion of the principal surface of the front case 101. That is, the display unit 151 may be disposed on a front surface of the terminal, and display visual information. The display unit 151 disclosed herein has a shape extending up to other surfaces of the terminal as well as the front surface of the terminal. In more detail, the display unit 151 is provided with a first main display (touch screen, first area) 151 located on the front surface, and second and third sub displays (second and third areas) 151-1 and 151-2 which extend from the first area 151 and are located on side surfaces of the main body.

Referring to FIG. 3B, a rear surface of the terminal body, namely, the rear case 102 may further be provided with a camera module 121'. The camera module 121' faces a direction which is opposite to a direction faced by the camera module 121 disposed on the front surface of the terminal body, and may have different pixels from those of the camera module 121.

For example, the camera module 121 operates with relatively lower pixels (lower resolution). Thus, the camera module 121 may be useful when a user can capture his face and send it to another party during a video call or the like. On the other hand, the camera module 121' operates with a relatively higher pixels (higher resolution) such that it can be useful for a user to obtain higher quality pictures for later use. The camera modules 121 and 121' may be installed in the terminal body to be rotatable or popped up.

A flash and a mirror may additionally be disposed adjacent to the camera 121'. The flash may operate in conjunction with the camera 121' when taking a picture using the camera 121'. The mirror can cooperate with the camera 121' to allow a user to photograph himself in a self-portrait mode.

An audio output module 152' may further be disposed at a rear face of the terminal body, namely, the rear case. The audio output module 152' can cooperate with the audio output module 152 located on the front face to provide stereo output. Also, the audio output module 152' may be configured to operate as a speakerphone.

That is, the audio output module 152 (first audio output module) provided on the front face of the terminal may be implemented as a receiver, and the second audio output module 152' provided on the rear face of the terminal may be implemented as a speaker. However, the present disclosure may not be limited to this. The second audio output module 152' may be provided on a side surface of the terminal.

A power supply unit 190 for supplying power to the mobile terminal may be mounted in the terminal body. The power supply unit 190 may be mounted in the terminal body or detachably coupled directly onto the outside of the terminal body.

As illustrated, a rear input unit 132 may be provided on the rear face of the terminal body. The rear input unit 132, for example, may be located beneath the camera module 121'.

The rear input unit 132 is manipulated to receive a command for controlling an operation of the mobile terminal 100. The rear input unit 132 may be set to allow inputting of various contents. For example, the commands input through the rear input unit 132 may be commands such as power on/off, start, end, scroll and the like, and commands such as volume adjustment of sounds output from the audio output module 152, conversion of the display unit 151 into a touch recognition mode, and the like. However, the present disclosure may not be limited to this. The terminal may also be provided with one of the front input unit and the rear input unit 132.

Figure 4:
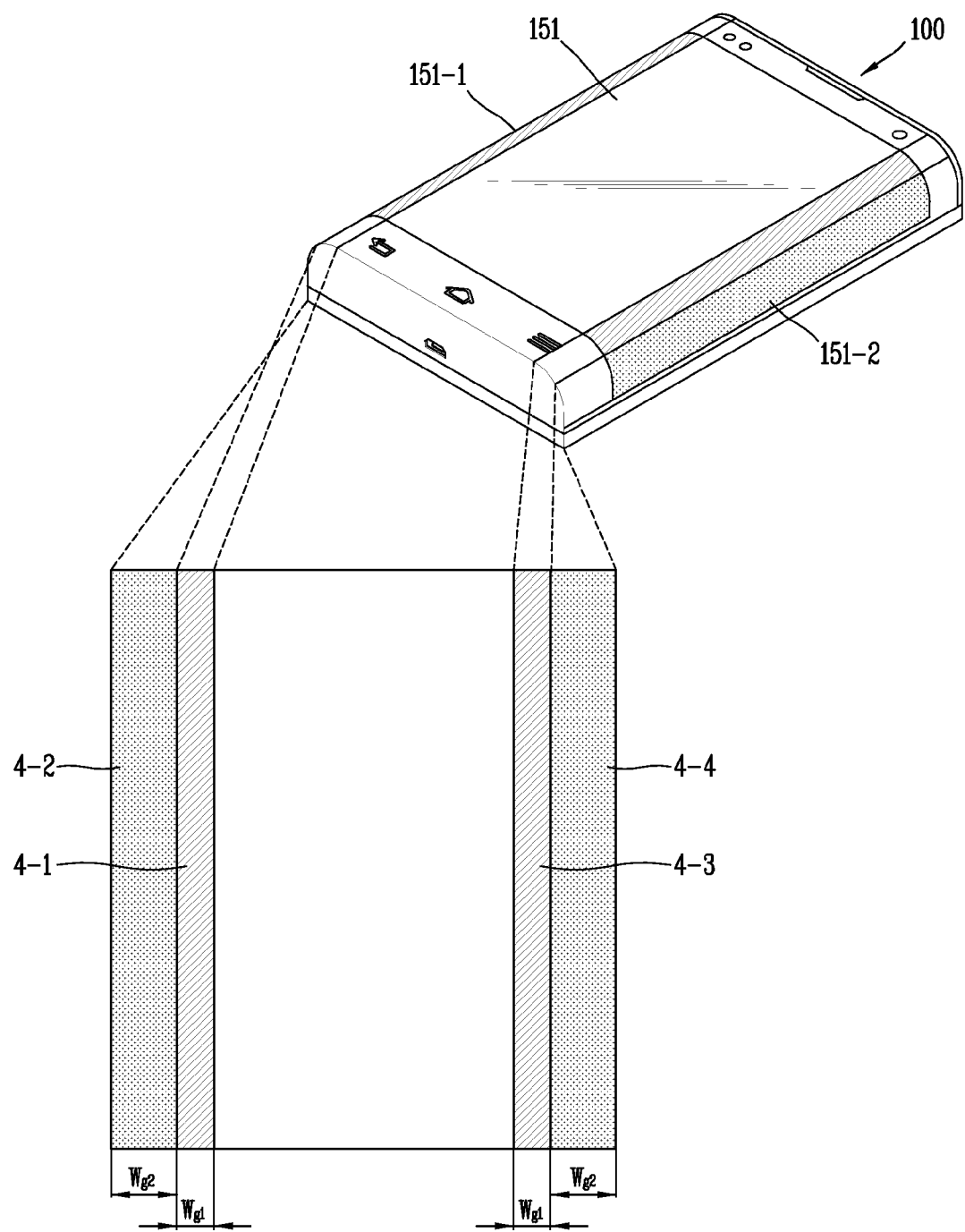
FIG. 4 is an exemplary view illustrating a touch screen (display) of a mobile terminal in accordance with exemplary embodiments disclosed herein.

FIG. 4 is an exemplary view illustrating a touch screen (display) of a mobile terminal in accordance with exemplary embodiments disclosed herein.

As illustrated in FIG. 4, a main display (touch screen) 151 of the mobile terminal 100 extends from a front surface to side surfaces of the mobile terminal 100. For example, the mobile terminal 100 includes a main display 151 that is provided on the front surface of the mobile terminal 100, a first sub display (touch screen) 151-1 that extends from the main display 151 and is located on a left side surface of the mobile terminal 100, and a second sub display (touch screen) 151-2 that extends from the main display 151 and is located on a right side surface of the mobile terminal 100. The main display 151, the first sub display 151-1 and the second sub display 151-2 may be flexible displays.

A bezel area of the touch screen may be defined by a first bezel area 4-1 that is located at a left side of the front surface of the touch screen, a second bezel area 4-2 that is located at a left side surface of the touch screen, a third bezel area 4-3 that is located at a right side of the front surface of the touch screen, and a fourth bezel area 4-4 that is located at a right side surface of the touch screen. For example, when the mobile terminal 100 is gripped by the user, a partial area of the main display 151, the first sub display (touch screen) 151-1, 4-2 and the second sub display 151-2, 4-4 may be recognized as the bezel area.

The first bezel area 4-1 and third bezel area 4-3 may have the same width as each other or different widths from each other. The second bezel area 4-2, 151-1 and the fourth bezel area 4-4, 151-2 may have the same width as each other or different widths from each other. The widths of the first bezel area 4-1 and the third bezel area 4-3 may be smaller or greater than the widths of the second bezel area 4-2, 151-1 and the fourth bezel area 4-4, 151-1.

Also, the bezel area of the touch screen may be configured such that the first bezel area 4-1 and the second bezel area 4-2, 151-1 are defined as one bezel area, and the third bezel area 4-3 and the fourth bezel area 4-4, 151-2 are defined as another bezel area. The widths $W_{g1}$ and $W_{g2}$ of the first to fourth bezel areas 4-1 to 4-4 may be preset by a designer or set by a user.

When the mobile terminal 100 is gripped by the user, the controller 180 may preset, as a grip pattern, a maximum width and a minimum width (or a maximum width range and a minimum width range) of a touch area which corresponds to touch inputs applied to the first to fourth bezel areas 4-1, 4-2, 4-3 and 4-4. The controller 180 may recognize that the mobile terminal 100 has been gripped by the user's right hand when one touch input (for example, a touch input applied by a thumb) is applied to the third and/or fourth bezel area(s) 4-3 and/or 4-4 of the first to fourth bezel areas 4-1 to 4-4 and at least two touch inputs (for example, touch inputs applied by the other fingers except for the thumb) are applied to the first and/or second bezel area(s) 4-1 and/or 4-2. On the other hand, the controller 180 may recognize that the mobile terminal 100 has been gripped by the user's left hand when at least two touch inputs (for example, touch inputs applied by the other fingers except for the thumb) are applied to the third and/or fourth bezel area(s) 4-3 and/or 4-4 of the first to fourth bezel areas 4-1 to 4-4 and one touch input (for example, a touch input applied by a thumb) is applied to the first and/or second bezel area(s) 4-1 and/or 4-2.

In a state that the user grips the mobile terminal 100 without obscuring the main display 151 of the mobile terminal 100, when at least two touch inputs (for example, touch inputs applied by the other fingers except for the thumb) are applied to the third and/or fourth bezel area(s) 4-3 and/or 4-4 of the first to fourth bezel areas 4-1 to 4-4 and one touch input (for example, a touch input applied by a thumb) is applied to the first and/or second bezel area(s) 4-1 and/or 4-2, the controller 180 may recognize that the mobile terminal 100 has been gripped by the user's right hand.

In the state that the user grips the mobile terminal 100 without obscuring the main display 151 of the mobile terminal 100, when the at least two touch inputs (for example, touch inputs applied by the other fingers except for the thumb) are applied to the third and/or fourth bezel area(s) 4-3 and/or 4-4 of the first to fourth bezel areas 4-1 to 4-4 and one touch input (for example, a touch input applied by a thumb) is applied to the first and/or second bezel area(s) 4-1 and/or 4-2, the controller 180 may recognize that the mobile terminal 100 has been gripped by the user's left hand.

Therefore, when a display area of the main display 151 is obscured by the user's palm or the main display 151 of the mobile terminal 100 is located in a direction of the gravity (for example, when the mobile terminal 100 is placed on a desk in a turned-over state), the main display 151 is invisible, which makes the user feel inconvenient in checking event information (for example, call signal, text message, email, etc.) displayed on the main display 151. Hence, under the state, such event information is displayed on the first sub display (touch screen) 151-1 and/or the second sub display 151-2.

The controller 180 detects a maximum width and a minimum width of a touch area corresponding to a touch input with respect to the first to fourth bezel areas 4-1 to 4-4. When the detected maximum width and the minimum width are the same as or similar to the grip pattern, the controller 180 may block touch information corresponding to the touch input, thereby effectively preventing an erroneous touch operation with respect to the touch screen.

The controller 180 detects the maximum width and the minimum width of the touch area corresponding to the touch input with respect to the first to fourth bezel areas 4-1 to 4-4. When the detected maximum width belongs to a maximum width range corresponding to the grip pattern and the minimum width of the touch area corresponding to the received touch input belongs to a minimum width range corresponding to the grip pattern, the controller 180 may block touch information corresponding to the touch input, thereby preventing an erroneous touch operation with respect to the touch screen.

Figure 5:
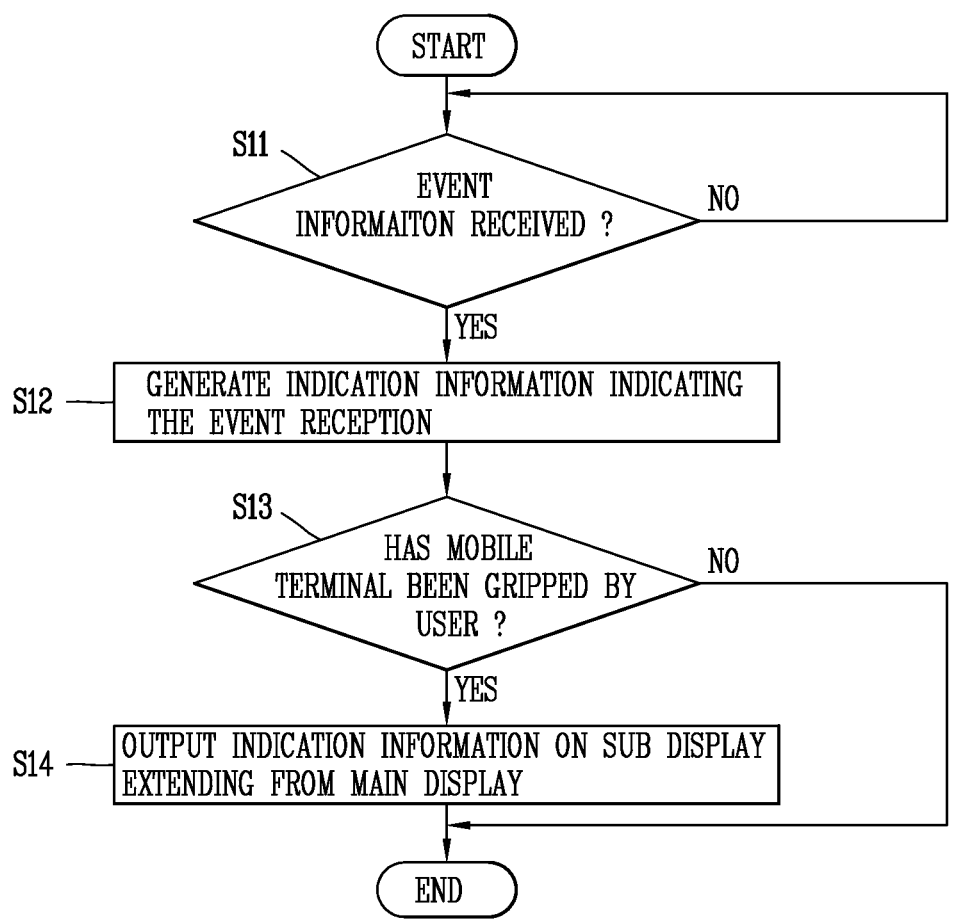
FIG. 5 is a flowchart illustrating a control method of a mobile terminal in accordance with a first exemplary embodiment disclosed herein.

FIG. 5 is a flowchart illustrating a control method of a mobile terminal 100 in accordance with a first exemplary embodiment disclosed herein.

First, the controller 180 decides (determines) whether or not event information has been received through the wireless communication unit 110 (S11). For example, the controller 180 may decide whether or not event information (or indication information), such as a call signal, a text message, an email, or the like, has been received through the wireless communication unit 110.

The controller 180 generates indication information indicating that the event information has been received (S12). For example, the controller 180 may generate, as the indication information, originator information related to the call signal (event information), an icon indicating partial contents (brief contents) of the message (event information) or the message, or an icon indicating partial contents (brief contents) of the email (event information) or the email.

The controller 180 decides whether or not the mobile terminal 100 has been gripped by a user (S13).

When the mobile terminal 100 is gripped by the user, the controller 180 displays the indication information on a sub display extending from the main display 151 of the mobile terminal 100, other than on the main display 151 (S14). For example, if a touch position of the user's thumb is located on the first sub display 151-1 while the mobile terminal 100 is gripped by the user, the controller 180 displays the indication information on the first sub display 151-1. When the touch position of the user's thumb (one touch input) is located on the second sub display 151-2 while the mobile terminal 100 is gripped by the user, the controller 180 displays the indication information on the second sub display 151-2.

When the first or second sub display 151-1 or 151-2 is touched while the first and second sub displays 151-1 and 151-2 are turned off or when preset information is input by the user (for example, when the user writes "Summary" using a pen) on the first or second sub display 151-1 or 151-2 while the first and sub displays 151-1 and 151-2 are turned off, the controller 180 may display the indication information on the touched sub display or the sub display with the preset information input thereto.

Therefore, in the control apparatus for the mobile terminal and the control method thereof according to the first exemplary embodiment disclosed herein, the indication information may be displayed on the first or second sub display, not on the main display 151, while the mobile terminal 100 is gripped by the user. This may facilitate the user to conveniently check the indication information through the first or second sub display.

Also, in the control apparatus for the mobile terminal and the control method thereof according to the first exemplary embodiment disclosed herein, the indication information may be displayed on a sub display (for example, the sub display receiving the touch input applied by the user's thumb) with the less number of user's touch inputs (with a wider display area for displaying the indication information) while the mobile terminal is gripped by the user. This may facilitate the user to conveniently check the indication information.

Figure 6:
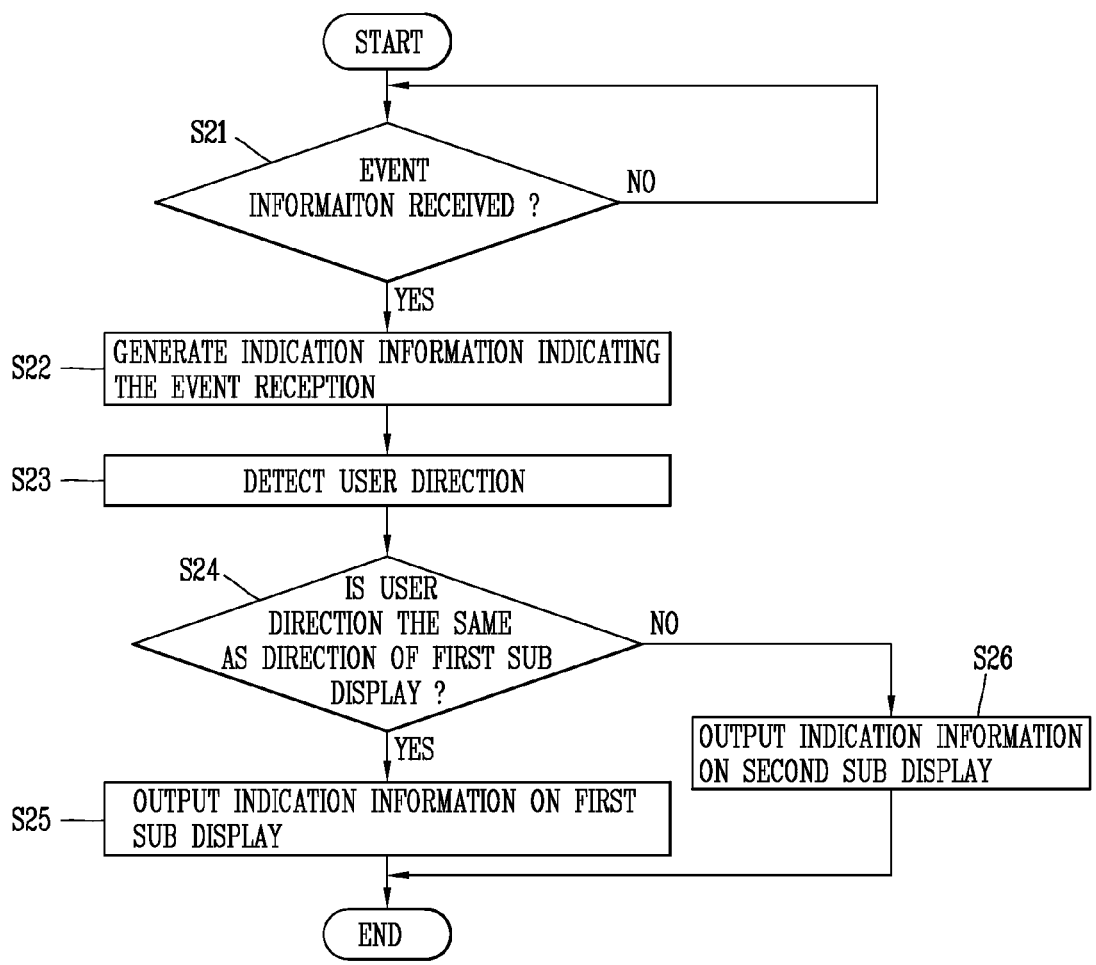
FIG. 6 is a flowchart illustrating a control method of a mobile terminal in accordance with a second exemplary embodiment disclosed herein.

FIG. 6 is a flowchart illustrating a control method of a mobile terminal in accordance with a second exemplary embodiment disclosed herein.

First, the controller 180 decides (determines) whether or not event information has been received through the wireless communication unit 110 (S21). For example, the controller 180 decides whether or not event information (or indication information), such as a call signal, a text message, an email, or the like, has been received through the wireless communication unit 110.

The controller 180 generates indication information indicating that the event information has been received (S22). For example, the controller 180 may generate, as the indication information, originator information related to the call signal (event information), an icon indicating partial contents (brief contents) of the message (event information) or the message, or an icon indicating partial contents (brief contents) of the email (event information) or the email.

The controller 180 detects a user's direction (user direction) as soon as generating the indication information indicating the reception of the event information (S23). For example, the mobile terminal 100 may further include a first directional microphone (not illustrated) receiving a first sound coming from a direction of the first sub display 151-1, and a second directional microphone receiving a second sound coming from a direction of the second sub display 151-2.

When a level of the first sound is higher than a level of the second sound, the controller 180 recognizes that the user is located in the direction of the first sub display 151-1. When the level of the second sound is higher than the level of the first sound, the controller 180 recognizes that the user is located in the direction of the second sub display 151-2. On the other hand, when a preset user voice is recognized from the first sound of the first and second sounds, the controller 180 may recognize that the user is located in the direction of the first sub display 151-1. When the preset user voice is recognized from the second sound of the first and second sounds, the controller 180 may recognize that the user is located in the direction of the second sub display 151-2.

The controller 180 decides whether or not the detected user direction is the direction of the first sub display (S24).

If the detected user direction is the direction of the first sub display 151-1, the controller 180 outputs the indication information on the first sub display 151-1 (S25).

If the detected user direction is the direction of the second sub display 151-2 other than the direction of the first sub display 151-1, the controller 180 outputs the indication information on the second sub display 151-2 (S26). For example, when the level of the first sound is higher than the level of the second sound, the controller 180 recognizes that the user is located in the direction of the first sub display 151-1, so as to output the indication information on the first sub display 151-1. When the level of the second sound is higher than the level of the first sound, the controller 180 recognizes that the user is located in the direction of the second sub display 151-2, so as to output the indication information on the second sub display 151-2. On the other hand, when the preset user voice is recognized from the first sound of the first and second sounds, the controller 180 may recognize that the user is located in the direction of the first sub display 151-1, so as to output the indication information on the first sub display 151-1. When the preset user voice is recognized from the second sound of the first and second sounds, the controller 180 may recognize that the user is located in the direction of the second sub display 151-2, so as to output the indication information on the second sub display 151-2.

While the mobile terminal 100 is gripped by the user, the controller 180 may display the indication information on the first sub display 151-1 or the second sub display 151-2 based on the detected user direction.

Figure 7:
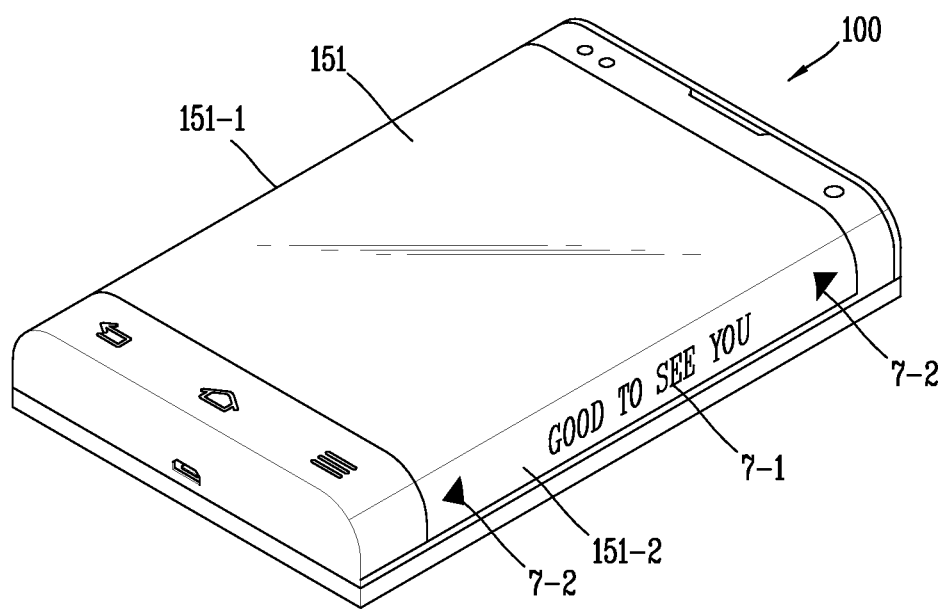
FIG. 7 is an exemplary view illustrating indication information displayed on a sub display according to exemplary embodiments disclosed herein.

FIG. 7 is an exemplary view illustrating indication information displayed on a sub display according to exemplary embodiments disclosed herein.

As illustrated in FIG. 7, the controller 180 outputs indication information 7-1 on the first and/or second sub display(s) 151-1 and/or 151-2. When a plurality of event information unchecked by the user are received, the controller 180 may generate a plurality of indication information indicating the reception of the plurality of event information, and then output a check (confirmation) key (or a navigational key) 7-2 for checking the plurality of indication information in a sequential manner on the first and/or second sub display(s) 151-1 and/or 151-2.

Therefore, in the control apparatus of the mobile terminal and the control method thereof in accordance with the second exemplary embodiment disclosed herein, the user direction can be detected and the indication information can be output on a sub display corresponding to the user direction. This may facilitate the user to conveniently check the indication information through the sub display corresponding to the direction that the user is located.

Also, in the control apparatus of the mobile terminal and the control method thereof in accordance with the second exemplary embodiment disclosed herein, while the mobile terminal 100 is gripped by the user, the user direction can be detected and the indication information can be output on a sub display corresponding to the user direction. This may facilitate the user to conveniently check the indication information through the sub display corresponding to the direction that the user is located.

Figure 8:
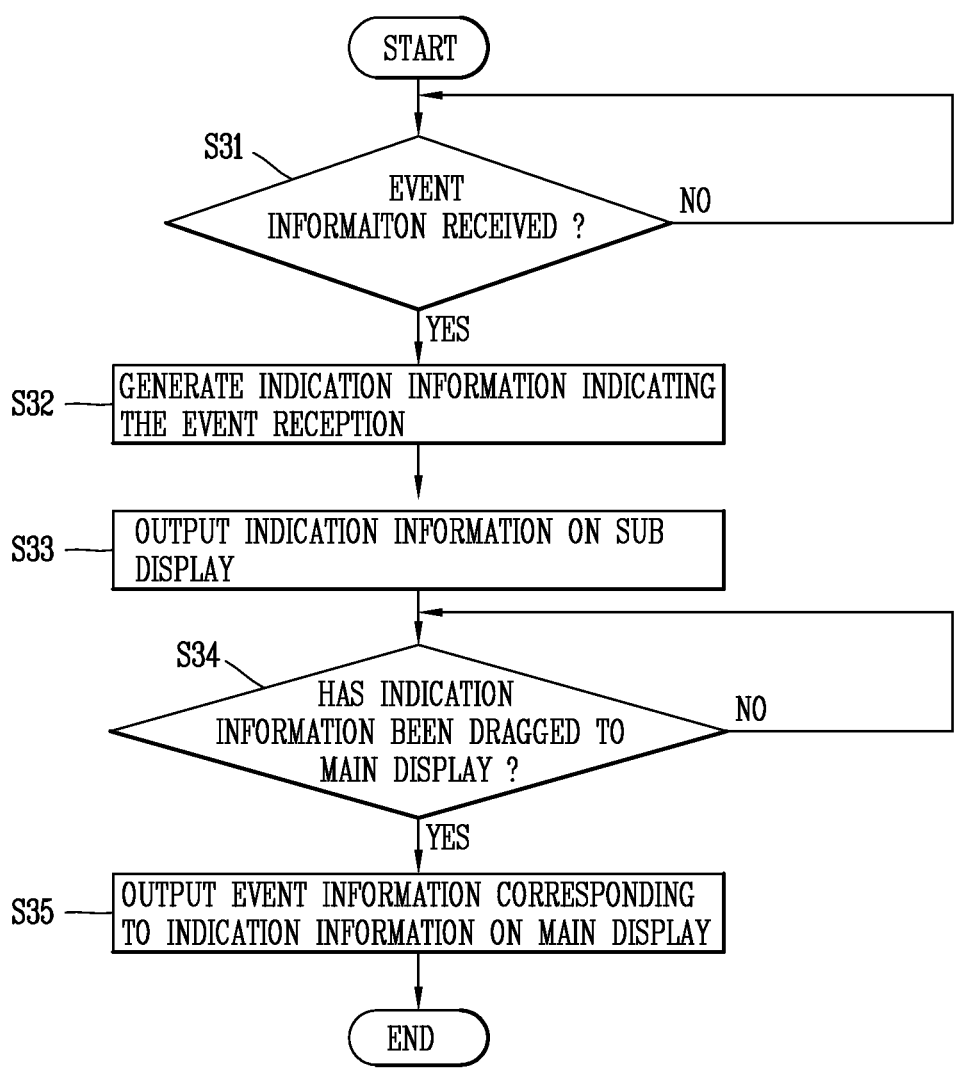
FIG. 8 is a flowchart illustrating a control method of a mobile terminal in accordance with a third exemplary embodiment disclosed herein.

FIG. 8 is a flowchart illustrating a control method of a mobile terminal in accordance with a third exemplary embodiment disclosed herein.

First, the controller 180 decides (determines) whether or not event information has been received through the wireless communication unit 110 (S31). For example, the controller 180 decides whether or not event information (or indication information), such as a call signal, a text message, an email, or the like, has been received through the wireless communication unit 110.

The controller 180 generates indication information indicating that the event information has been received (S32). For example, the controller 180 may generate, as the indication information, originator information related to the call signal (event information), an icon indicating partial contents (brief contents) of the message (event information) or the message, or an icon indicating partial contents (brief contents) of the email (event information) or the email.

The controller 180 detects a user's direction as soon as generating the indication information indicating the reception of the event information. For example, the mobile terminal 100 may further include a first directional microphone (not illustrated) receiving a first sound coming from a direction of the first sub display 151-1, and a second directional microphone receiving a second sound coming from a direction of the second sub display 151-2.

When a level of the first sound is higher than a level of the second sound, the controller 180 recognizes that the user is located in the direction of the first sub display 151-1. When the level of the second sound is higher than the level of the first sound, the controller 180 recognizes that the user is located in the direction of the second sub display 151-2. On the other hand, when a preset user voice is recognized from the first sound of the first and second sounds, the controller 180 may recognize that the user is located in the direction of the first sub display 151-1. When the preset user voice is recognized from the second sound of the first and second sounds, the controller 180 may recognize that the user is located in the direction of the second sub display 151-2.

The controller 180 decides whether or not the detected user direction is the direction of the first sub display 151-1.

If the detected user direction is the direction of the first sub display 151-1, the controller 180 outputs the indication information on the first sub display 151-1 (S33).

If the detected user direction is the direction of the second sub display 151-2 other than the direction of the first sub display 151-1, the controller 180 outputs the indication information on the second sub display 151-2. For example, when the level of the first sound is higher than the level of the second sound, the controller 180 recognizes that the user is located in the direction of the first subs display 151-1, so as to output the indication information on the first sub display 151-1. When the level of the second sound is higher than the level of the first sound, the controller 180 recognizes that the user is located in the direction of the second sub display 151-2, so as to output the indication information on the second sub display 151-2. On the other hand, when a preset user voice is recognized from the first sound of the first and second sounds, the controller 180 may recognize that the user is located in the direction of the first sub display 151-1, so as to output the indication information on the first sub display 151-1. When the preset user voice is recognized from the second sound of the first and second sounds, the controller 180 may recognize that the user is located in the direction of the second sub display 151-2, so as to output the indication information on the second sub display 151-2.

While the mobile terminal 100 is gripped by the user, the controller 180 may display the indication information on the first sub display 151-1 or the second sub display 151-2 based on the detected user direction.

The controller 180 decides whether or not the indication information which was output on the first or second sub display 151-1 or 151-2 has been dragged to the main display 151 (S34). For example, the controller 180 decides whether or not the indication information or an icon output on the first or second sub display 151-1 or 151-2 has been moved to the main display 151-1 through drag & drop.

When the indication information output on the first or second sub display 151-1 or 151-2 is moved to the main display 151-1 through drag & drop, the controller 180 displays the event information corresponding to the indication information on the main display 151 (S35). For example, in a state where indication information or an icon which indicates a reception of a call signal (event information) is output on the first or second sub display 151-1 or 151-2, when the indication information or the icon is dragged and then dropped to the main display 151, the controller 180 displays detailed information (for example, a photo, a name, a phone number and the like associated with an originator) related to the call signal on the main display 151. In a state where indication information or an icon which indicates a reception of a message (event information) is output on the first or second sub display 151-1 or 151-2, when the indication information or the icon is dragged and then dropped to the main display 151, the controller 180 displays full contents included in the message on the main display 151. In a state where indication information or an icon which indicates a reception of an email (event information) is output on the first or second sub display 151-1 or 151-2, when the indication information or the icon is dragged and then dropped to the main display 151, the controller 180 displays full contents included in the email on the main display 151.

Figure 9:
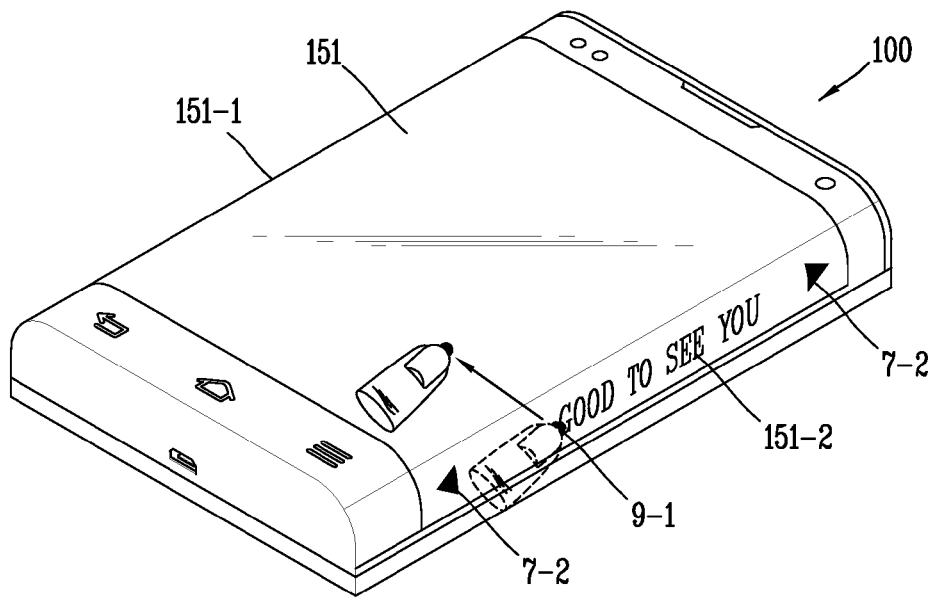
FIG. 9 is an exemplary view illustrating a process of outputting detailed information related to indication information displayed on a sub display to a main display in accordance with the third exemplary embodiment disclosed herein.

FIG. 9 is an exemplary view illustrating a process of outputting detailed information related to indication information displayed on a sub display to a main display in accordance with the third exemplary embodiment disclosed herein.

As illustrated in FIG. 9, if "indication information 9-1 indicating that a message (event information) has been received," displayed on the second sub display 151-2, is moved to the main display 151 by the user through drag & drop, the controller 180 displays full contents included in the message on the main display 151.

Figure 10:
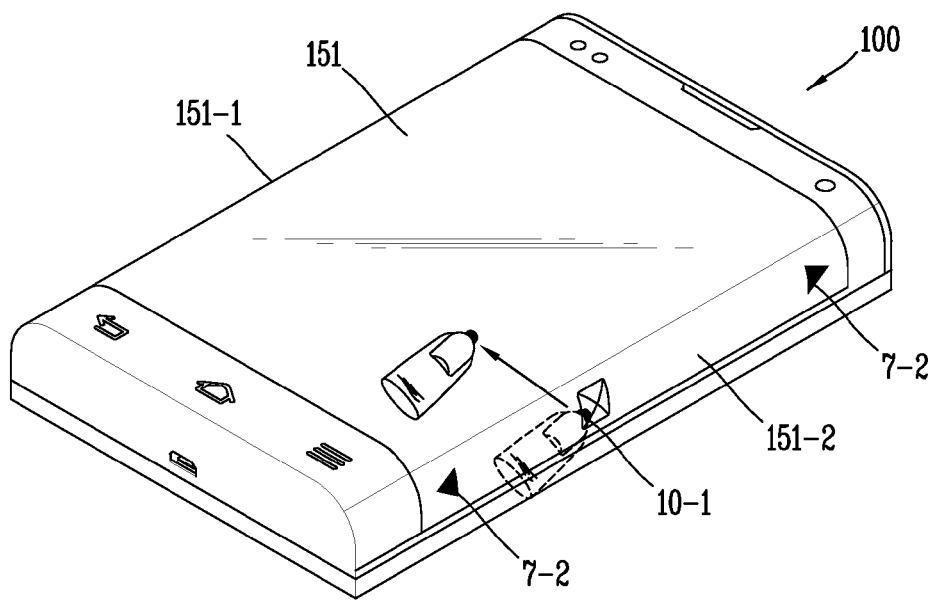
FIG. 10 is an exemplary view illustrating a process of outputting detailed information corresponding to an icon displayed on a sub display to a main display in accordance with the third exemplary embodiment disclosed herein.

FIG. 10 is an exemplary view illustrating a process of outputting detailed information corresponding to an icon displayed on a sub display to a main display in accordance with the third exemplary embodiment disclosed herein.

As illustrated in FIG. 10, if "an icon 10-1 indicating that a message (event information) has been received," displayed on the second sub display 151-2, is moved by the user to the main display 151 through drag & drop, the controller 180 displays full contents included in the message on the main display 151.

Figure 11A:
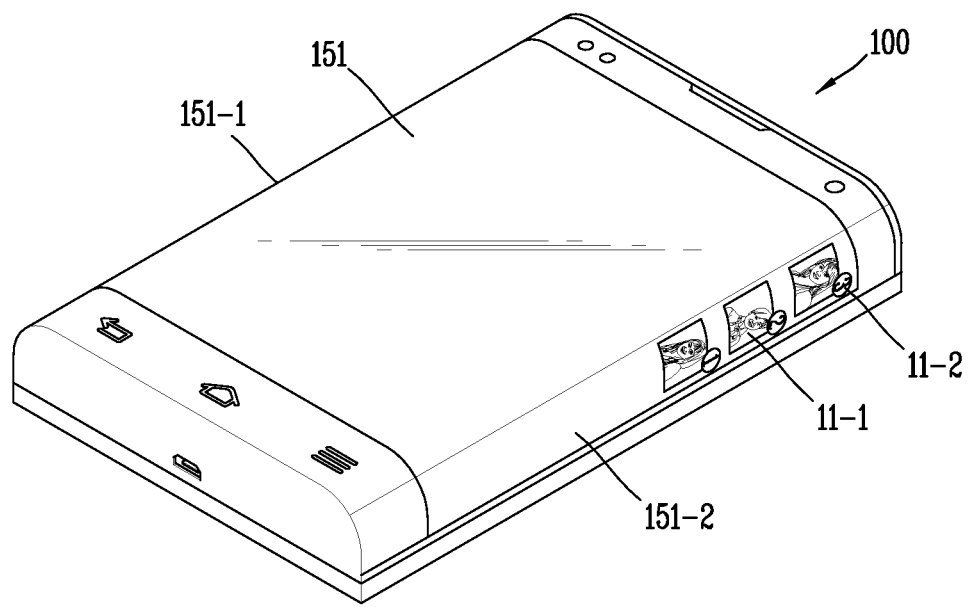
FIGS. 11A to 11C are exemplary views illustrating a process of outputting detailed information corresponding to an icon displayed on a sub display to a main display in accordance with the third exemplary embodiment disclosed herein.
Figure 11B:
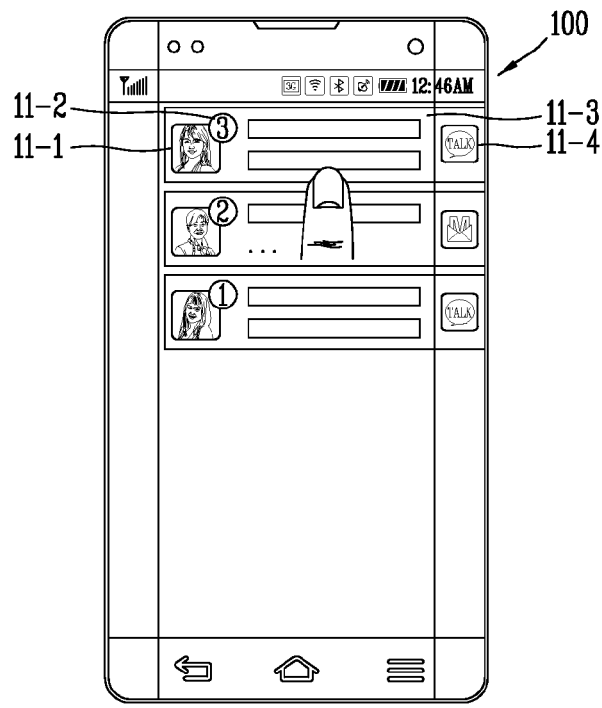
Figure 11C:
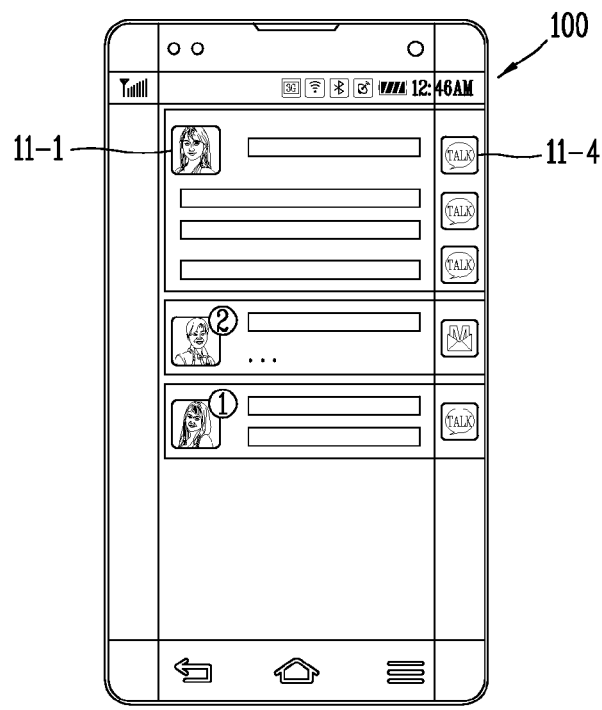

FIGS. 11A to 11C are exemplary views illustrating a process of outputting detailed information corresponding to an icon displayed on a sub display to a main display in accordance with the third exemplary embodiment disclosed herein.

As illustrated in FIG. 11A, the controller 180 displays on the first sub display 151-1 and/or the second sub display 151-2 an icon 11-1 which indicates that a message (event information) has been received from a first originator, and a number 11-2 of messages received from the first originator.

As illustrated in FIG. 11B, when the icon 11-1 is moved by the user to the main display 151 through drag & drop, the controller 180 displays a message corresponding to the icon 11-1 on the main display 151. When the icon 11-1 is dragged from a specific region of the first or second sub display 151-1 or 151-2, on which the icon 11-1 has been displayed, to the main display 151, the controller 180 may display on the main display 151 messages 11-3 corresponding to all the icons displayed on the first or second sub display 151-1 or 151-2.

When a message(s) with respect to one or all of the icons displayed on the first or second sub display 151-1 or 151-2 is(are) output on the main display 151, the controller 180 may display on the first or second sub display 151-1 or 151-2 application program type information (an icon indicating each application program) 11-4 of the message(s) with respect to the one or all of the icons.

When there are a plurality of messages with respect to a specific icon displayed on the main display 151, the controller 180 may display only an arbitrary message of the plurality of messages or a first-received message on the main display 151.

As illustrated in FIG. 11C, when the arbitrary message or the first-received message 11-3 (see FIG. 11B), displayed on the main display 151, is selected (touched) by the user, the controller 180 may display a plurality messages with respect to the specific icon (for example, three messages received from the same originator) on the main display 151.

Figure 12A:
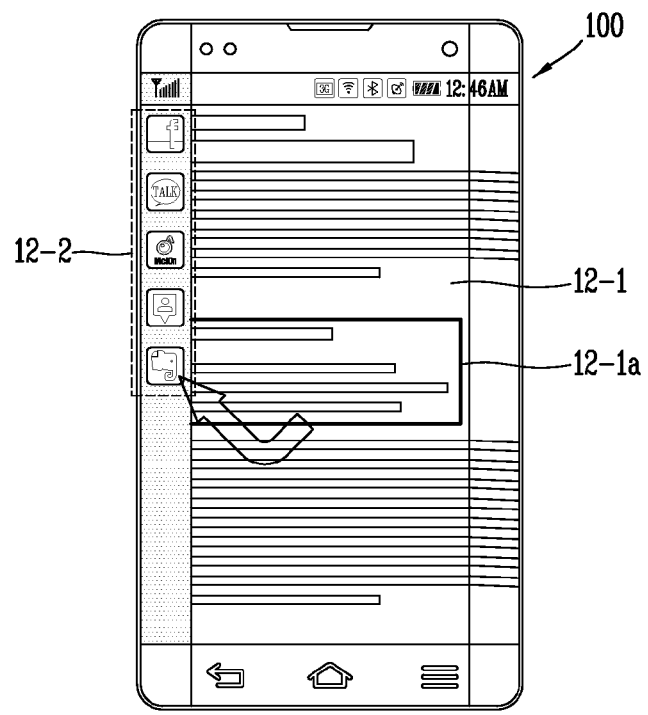
FIGS. 12A and 12B are exemplary views illustrating a method of processing contents displayed on a main display in accordance with the third exemplary embodiment disclosed herein.
Figure 12B:
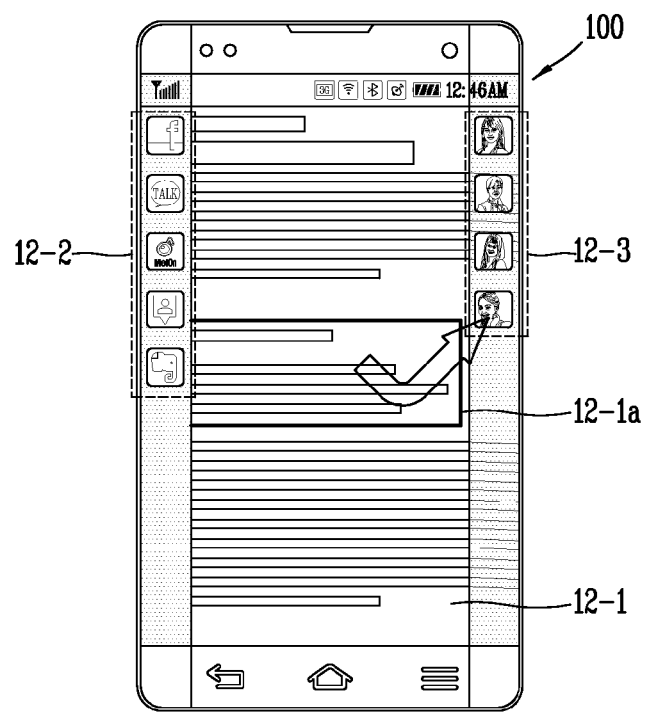

FIGS. 12A and 12B are exemplary views illustrating a method of processing contents displayed on a main display in accordance with the third exemplary embodiment disclosed herein.

As illustrated in FIG. 12A, the controller 180 displays contents 12-1 (for example, an electronic document, a magazine, a newspaper, an image, etc.) on the main display 151 according to a user's request, and displays on the first or second sub display 151-1 or 151-2 icons 12-2 which indicate application programs (for example, application programs, such as contents storage, contents reproduction (music, video), contents transmission (mail, messenger), and the like) for processing the contents 12-1.

When the contents 12-1 or a part 12-1a of the contents 12-1 are selected by the user and then moved to one of the icons 12-2 through drag & drop, the controller 180 executes an application program corresponding to the one icon, to process the contents 12-1 or the part 12-1a of the contents 12-1. For example, when the contents 12-1 or the part 12-1a of the contents 12-1 are selected by the user and then moved to an icon indicating the contents transmission application program (e.g., mail, messenger) of the icons 12-2 through drag & drop, the controller 180 transmits the contents 12-1 or the part 12-1a of the contents 12-1 through the contents transmission application program.

As illustrated in FIG. 12B, the controller 180 displays contents 12-1 (for example, an electronic document, a magazine, a newspaper, an image, etc.) on the main display 151 according to a user's request, and displays on the first sub display 151-1 icons 12-2 which indicate application programs (for example, application programs, such as contents storage, contents reproduction (music, video), contents transmission (mail, messenger), and the like) for processing the contents 12-1. Also, the controller 180 displays recipient-favorite icons 12-3 on the second sub display 151-2. The recipient-favorite icons 12-3 correspond to icons including recipient facial images (for example, friends' facial images and/or family members' facial images), preset by the user. The recipient-favorite icons 12-3 are cooperative with information-transmittable application programs. For example, when the part 12-1a of the contents 12-1 is moved to one of the recipient-favorite icons 12-3 through drag & drop, the controller 180 transmits the part 12-1a of the contents 12-1 to a recipient corresponding to the one icon through an information-transmittable application program (for example, a messenger application program) which is cooperative with the one icon.

Therefore, in the control apparatus of the mobile terminal and the control method thereof in accordance with the third exemplary embodiment disclosed herein, when indication information or an icon displayed on the first or second sub display is moved to the main display through drag & drop, detailed information corresponding to the indication information or the icon can be displayed on the main display. This may facilitate the user to conveniently check the indication information or the icon through the sub display and also to fast check detailed information corresponding to the indication information or the icon through the main display.

Hereinafter, description will be given of a control method of executing an application or using as a folder by accessing the application in a manner of combining front and side surfaces of a display unit.

Figure 13:
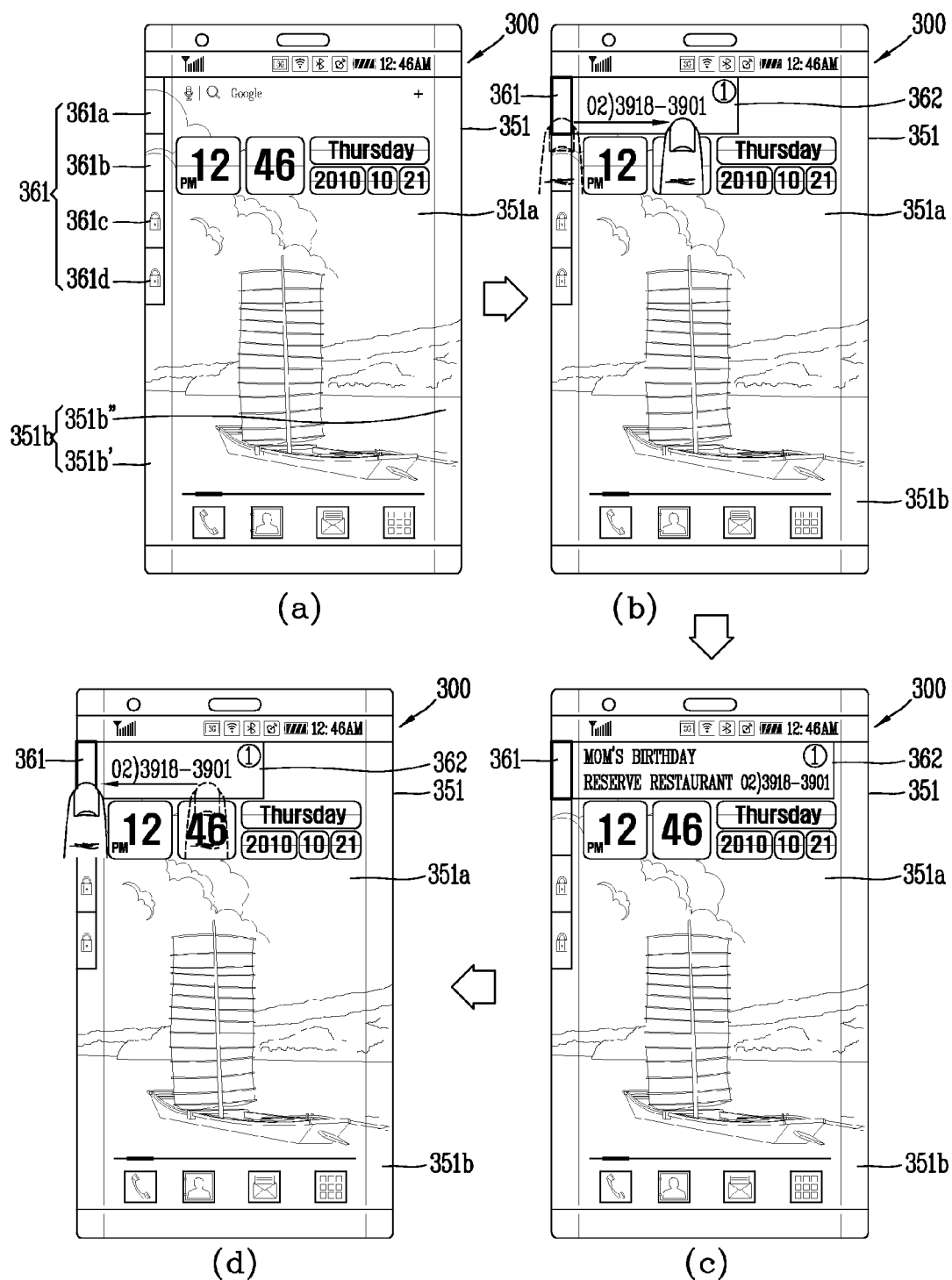
FIG. 13 is a conceptual view illustrating an operation implemented in a mobile terminal in accordance with the present disclosure.

FIG. 13 is a conceptual view illustrating an operation implemented in a mobile terminal 300 in accordance with the present disclosure.

As illustrated in (a) of FIG. 13, a display unit 351 includes a first area (main display) 351a located on a front surface of a main body of the mobile terminal 300, and a second area (first and second sub displays) 351b extending from the first area 351a and located on side surfaces of the main body. As illustrated, the first area 351a and the second area 351b display different types of information, and thus are divided due to having different types of graphic user interfaces (GUIs).

The second area 351b may be provided with a left area 351b' and a right area 351b" located at left and right side surfaces of the terminal, respectively. Therefore, the second area 351b has a left-right symmetric structure based on the first area 351a.

A home screen page may be output on the display unit 351 of the mobile terminal 300. At least one graphic image may be included in the home screen page. The graphic image may be an icon of an application installed in the mobile terminal 300 or a widget. The home screen page may be output on a combined area of the first area 351a and the second area 351b.

A graphic object 361 corresponding to at least one application is output on the second area 351b. The graphic object 361 may be output on at least one of the left area 351b' and the right area 351b" of the second area 351b. The second area 351b may be divided into a plurality of distinctive portions, and graphic objects 361a, 361b, 361c and 361d corresponding to different applications may be output on the respective portions. The applications corresponding to the respective graphic objects 361a, 361b, 361c and 361d may be decided based on a user input.

The graphic object 361 may be output on at least one of the left area 351b' and the right area 351b". This exemplary embodiments illustrates that the graphic object 361 is located on the left area 351W. The graphic object 361 is a bar-shaped image which is long along the side surface of the terminal. A plurality of graphic objects 361 may thus be displayed in a manner of being arranged adjacent to a top of the left area 351b'.

As illustrated in (b) of FIG. 13, when a touch input is applied to the graphic object 361, the controller 180 (see FIG. 1) executes an application corresponding to the graphic object 361 and outputs the application to the first area 351a. The touch input applied to the graphic object 361 may be an one-time touch or a touch of dragging the graphic object 361 to the first area 351a.

The application corresponding to the graphic object 361 may be output on all or a part of the first area 351a. As illustrated, an image 362 which gradually changes in size from the second area 351b to the first area 351a may be generated and then the application may be output on the image 362. That is, in response to a touch input, screen information is converted (changed) into a form that the image 362 is unrolled (unfolded), and the screen information output on the image 362 also gradually appears. In more detail, the image 362 may be provided with an effect that a paper or the like is unrolled from a rolled shape in response to a touch input applied.

The display unit 351 may be provided with a touch sensor which is sensitive to touch such that a touch input applied to the graphic object 361 can be sensed. The display unit 351 outputs visible information which is implemented in the form of an image such as the GUI, a text, an icon and the like, but may be converted into an inactive state after a predetermined period of time or in response to an input of a specific control command.

As illustrated in (c) of FIG. 13, the application corresponding to the graphic object 361 is activated and output on the first area 351a. The application may be output on the image 362 which is output on the first area 351a.

As illustrated in (d) of FIG. 13, as the graphic object 361 is touched again, a screen output before the application corresponding to the graphic object 361 is activated within the first area 351a is output again. The image 362 which is unrolled (unfolded) from the second area 351b to the first area 351a may be provided with an effect of re-disappearing towards the second area 351b.

The screen output prior to the execution of the application corresponding to the graphic object 361 may not be limited to a home screen page, but may also be an output screen of an application which has already been executed on the terminal before the execution of the application corresponding to the graphic object 361.

As a touch input is applied to the graphic object 361 output on the second area 351b, the screen information output on the first area 351a may keep changing, but the output state (display state) of the graphic object 361 on the second area 351b is maintained, independent of the change of the screen information output on the first area 351a. Therefore, even without moving into the home screen page while another application is executed on the first area 351a, the user may activate the application corresponding to the graphic object 361 by touching the graphic object 361 output on the second area 351b. Also, since the graphic object 361 is continuously output on the second area 351b, independent of the change of the screen information output on the first area 351a, accessibility with respect to the application corresponding to the graphic object 361 may be ensured.

In the related art, to execute another application while an application is run in the mobile terminal 300, there has been inconvenience in that the currently-run application has to be deactivated or a screen of the currently-run application has to be changed into a home screen page, and thereafter a shortcut icon 363 (see FIG. 15A) of the another application has to be selected from the home screen page.

The present disclosure can maintain the output state of the graphic object 361 on the second area 351b, independent of the change (conversion) of the screen information output on the first area 351a and allow the user to run the application corresponding to the graphic object 361 by touching the graphic object 361. This may result in overcoming the inconvenience occurred in the related art mobile terminal. Even while a plurality of applications are run in the terminal, the application corresponding to the graphic object 361 can be immediately executed by touching the graphic object 361.

Hereinafter, description will be given of a method of controlling the mobile terminal 300 for implementing those operations illustrated in FIG. 13.

Figure 14:
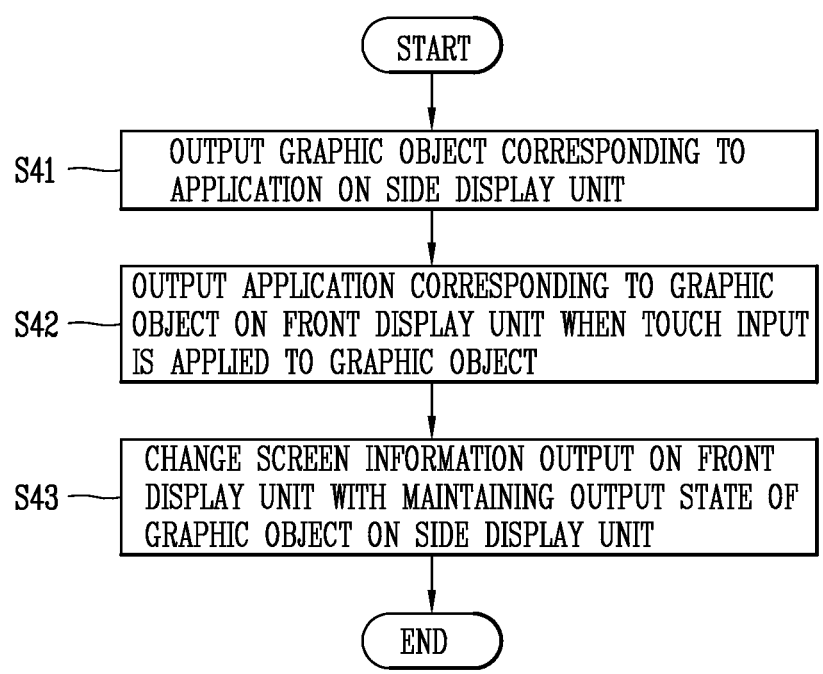
FIG. 14 is a flowchart illustrating another control method of a mobile terminal in accordance with the present disclosure.

FIG. 14 is a flowchart illustrating another control method of a mobile terminal in accordance with the present disclosure.

First, a graphic object 361 corresponding to an application is output on a side display unit 351b (S41).

The application corresponding to the graphic object 361 refers to any type of application program which can be run in the terminal. Therefore, the application may be a program for executing a web browser, an image output or a video reproduction, a message transmission/reception, a schedule management, social networking service (SNS), an email transmission/reception, an application updating and the like.

The graphic object 361 output on the second area 351b, as illustrated in FIG. 13, may have a bar-like shape which is long along the side surface of the terminal. The graphic object 361 may also be a graphic image, for example, a shortcut icon 363, indicating the application corresponding to the graphic object 361. Even when the graphic object 361 is output in plurality, the plurality of graphic objects may be output with different shapes, lengths, colors and the like to be distinguished over one another. An additional image indicating a state of the application may be displayed on the graphic object 361. For example, when an event is generated in the application corresponding to the graphic object 361, a number indicating the number of events generated may be added to the graphic object 361. Also, if a password input is required for executing the application corresponding to the graphic object 361, an additional image indicating a lock state set for the application may be displayed on the graphic object 361.

Next, when a touch input is applied to the graphic object 361, the application corresponding to the graphic object 361 is output on the front display unit 351 (S42).

When a touch input is applied to the graphic object 361, the controller 180 executes the application corresponding to the graphic object 361 and outputs the executed application on the first area 351a. The application may be output on a part or all of the first area 351a. The application may also be output on both the first area 351a and a part of the second area 351b. For example, the application may be output over the first area 351a and the right area 351b".

The first area 351a is divided into a plurality of distinctive portions. When a touch input is applied to the graphic object 361, the application corresponding to the graphic object 361 may be output on a portion, on which any application has not been output, of the plurality of portions of the first area 351a. Here, a plurality of applications are output on the different portions of the first area 351a, respectively.

Finally, the screen information output on a front display unit is changed (converted) while maintaining the output state of the graphic object 361 which is output on the side display unit (S43).

As the application corresponding to the graphic object 361 is executed and output on the first area 351a, the screen information output on the first area 351a may be momentarily changed. In the present disclosure, in order for the graphic objects 361 to be output independent of the change of the screen information output on the first area 351a, the screen information output on the first area 351a is changed while maintaining the output state of the graphic object 361 on the second area 351b. Accordingly, the screen information within the first area 351a is momentarily changed but the graphic object 361 output on the second area 351b remains in the output state while the display unit 351 is activated.

Therefore, the user may be facilitated to run the application corresponding to the graphic object 361. The user may not have to move the application to a home screen page or terminate the output of a currently-output application in order to run the application corresponding to the graphic object 361. Also, the user can activate the application corresponding to the graphic object 361 directly by touching the graphic object 361 located on the second area 351b, irrespective of contents, type or attribute of the screen information which is output on the first area 351a.

Consequently, the present disclosure can ensure user's accessibility with respect to the application corresponding to the graphic object 361, thereby enhancing user's convenience in using the terminal.

The aforementioned control methods associated with the present disclosure may be embodied into various forms, as will be explained later with reference to the following drawings. Hereinafter, detailed exemplary embodiments of the control methods associated with the present disclosure will be described. Here, it should be noticed that the same/like constituent elements have the same/like reference numerals, and descriptions thereof is not repeated.

Figure 15A:
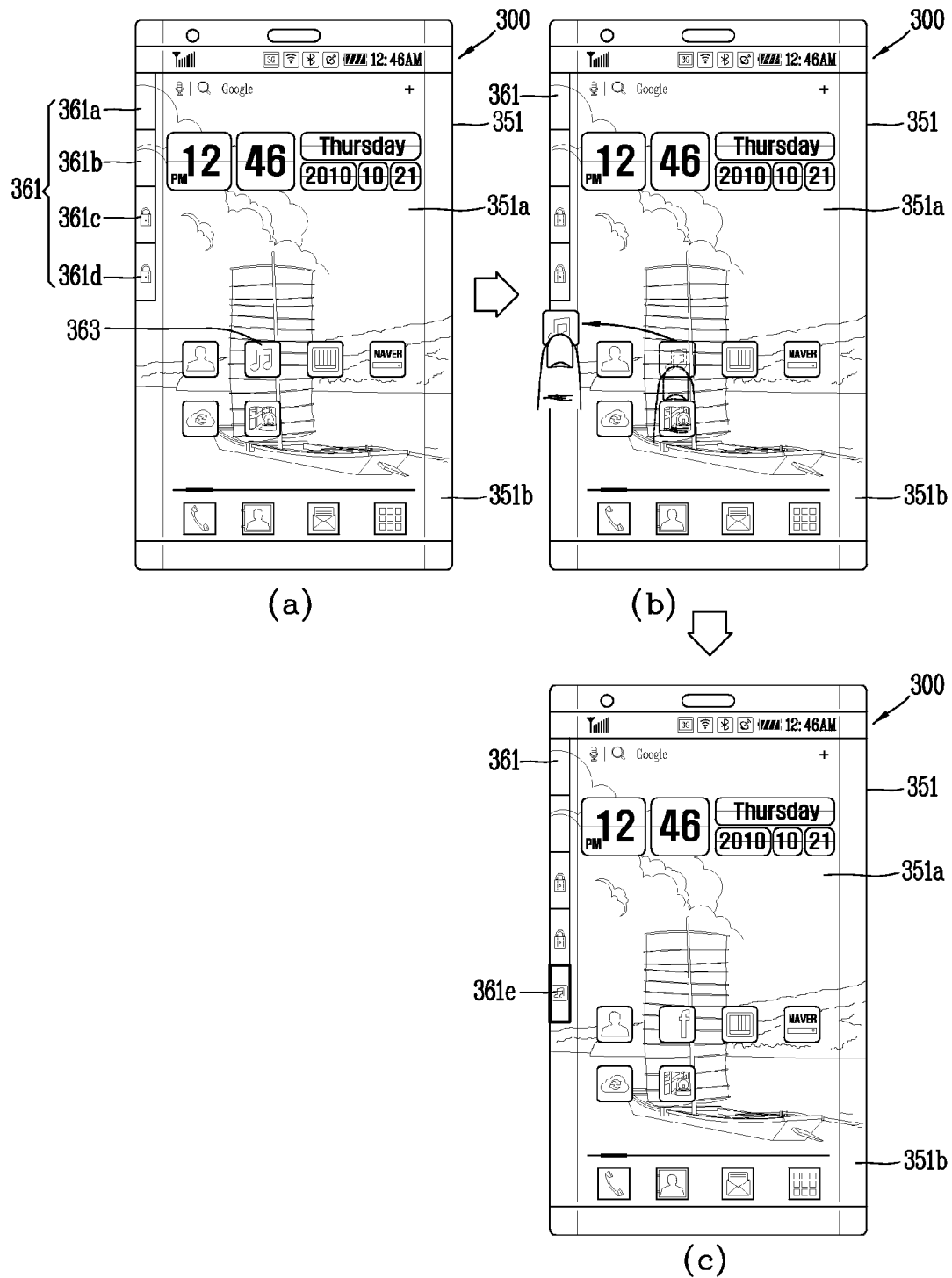
FIGS. 15A and 15B are conceptual views illustrating a control operation of editing a graphic object output on a side display unit according to a user selection.
Figure 15B:
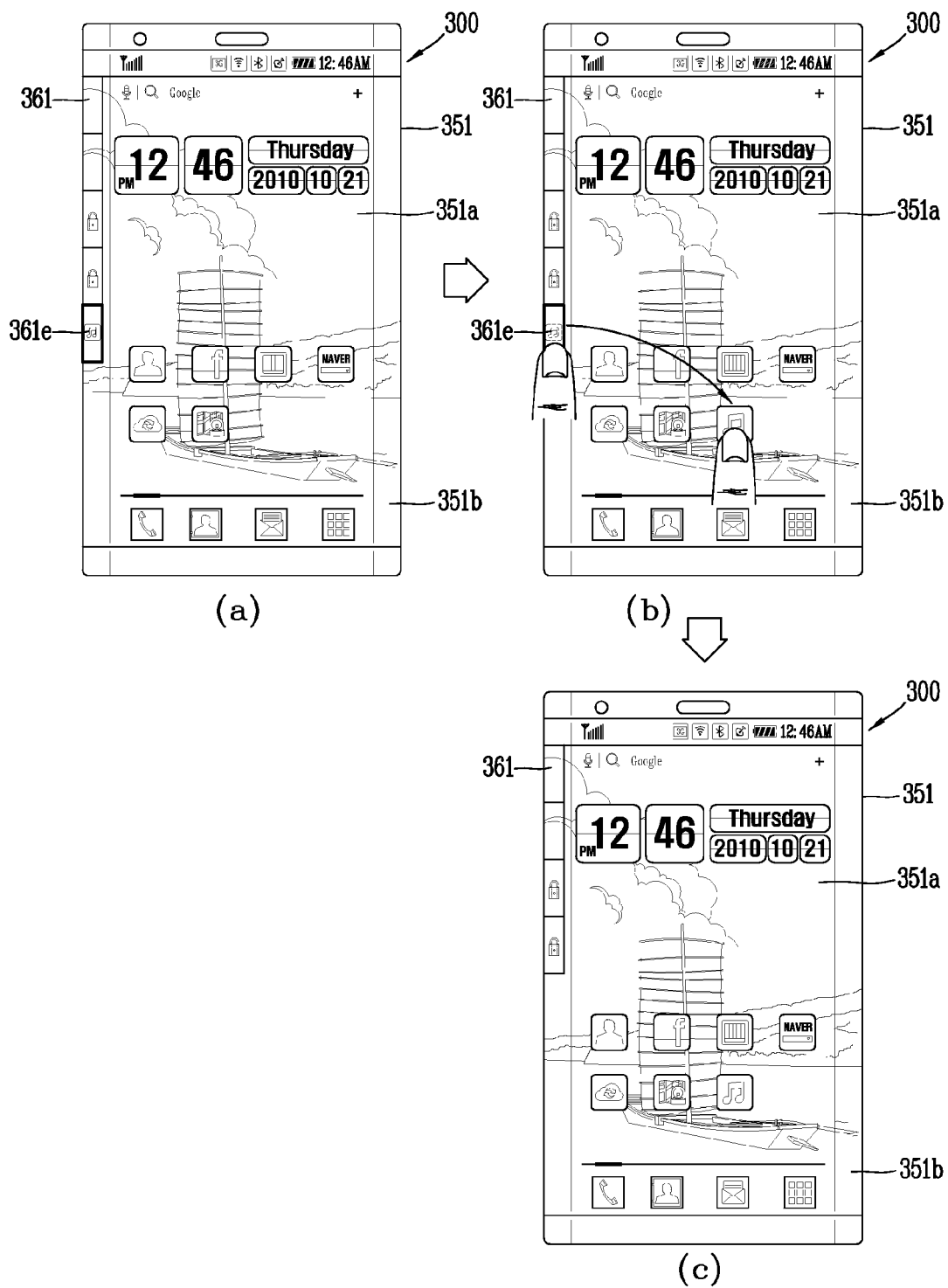

FIGS. 15A and 15B are conceptual views illustrating a control operation of editing the graphic object 361 output on a side display unit according to a user selection.

FIG. 15A is a conceptual view illustrating a control operation of generating the graphic object 361 output on the side display unit according to a user selection.

The second area 351b is divided into a plurality of distinctive portions and graphic objects 361a, 361b, 361c and 361d corresponding to different applications are output on the respective portions. The applications corresponding to the respective graphic objects 361a, 361b, 361c and 361d may be decided based on a user input. A new graphic object 361e may be generated in the second area 351b in response to a user input.

As illustrated in (a) of FIG. 15A, a shortcut icon 363 corresponding to an application is output on a home screen page of the first area 351a. The already-generated graphic objects 361a, 361b, 361c and 361d are output on the second area 351b.

As illustrated in (b) of FIG. 15A, an input of moving the shortcut icon 363 output on the first area 351a to the second area 351b through drag & drop is applied. As illustrated in (c) of FIG. 15A, the new graphic object 361e corresponding to the application is generated in the second area 351b.

When the newly-generated graphic object 361e within the second area 351b is touched, the controller 180 (see FIG. 1) executes the application corresponding to the newly-generated graphic object 361e and outputs the executed application on the first area 351a. The output state of the graphic object 361 on the second area 351b is maintained, independent of the change of the screen information within the first area 351a.

FIG. 15B is a conceptual view illustrating a control of removing the graphic object 361 output on the side display unit according to a user selection.

An application corresponding to the graphic object 361 is decided based on a user input. The graphic object 361 may be removed from the second area 351b based on a user input.

As illustrated in (a) of FIG. 15B, a shortcut icon 363 corresponding to an application is output on a home screen page of the first area 351a. The already-generated graphic objects 361 are output on the second area 351b.

As illustrated in (b) of FIG. 15B, an input of moving one graphic object 361e output on the second area 351b through drag & drop is applied. As illustrated in (c) of FIG. 15B, the graphic object 361e is removed from the second area 351b.

As illustrated in FIGS. 15A and 15B, the graphic object 361 output on the second area 351b may be newly generated or removed based on the user input. The graphic object 361 corresponding to a specific application may be edited through the generation and removal process of the graphic object 361, illustrated in FIGS. 15A and 15B.

Hereinafter, description will be given of a control of outputting a plurality of applications on the display unit 351 using the graphic object 361 output on the side display unit.

Figure 16:
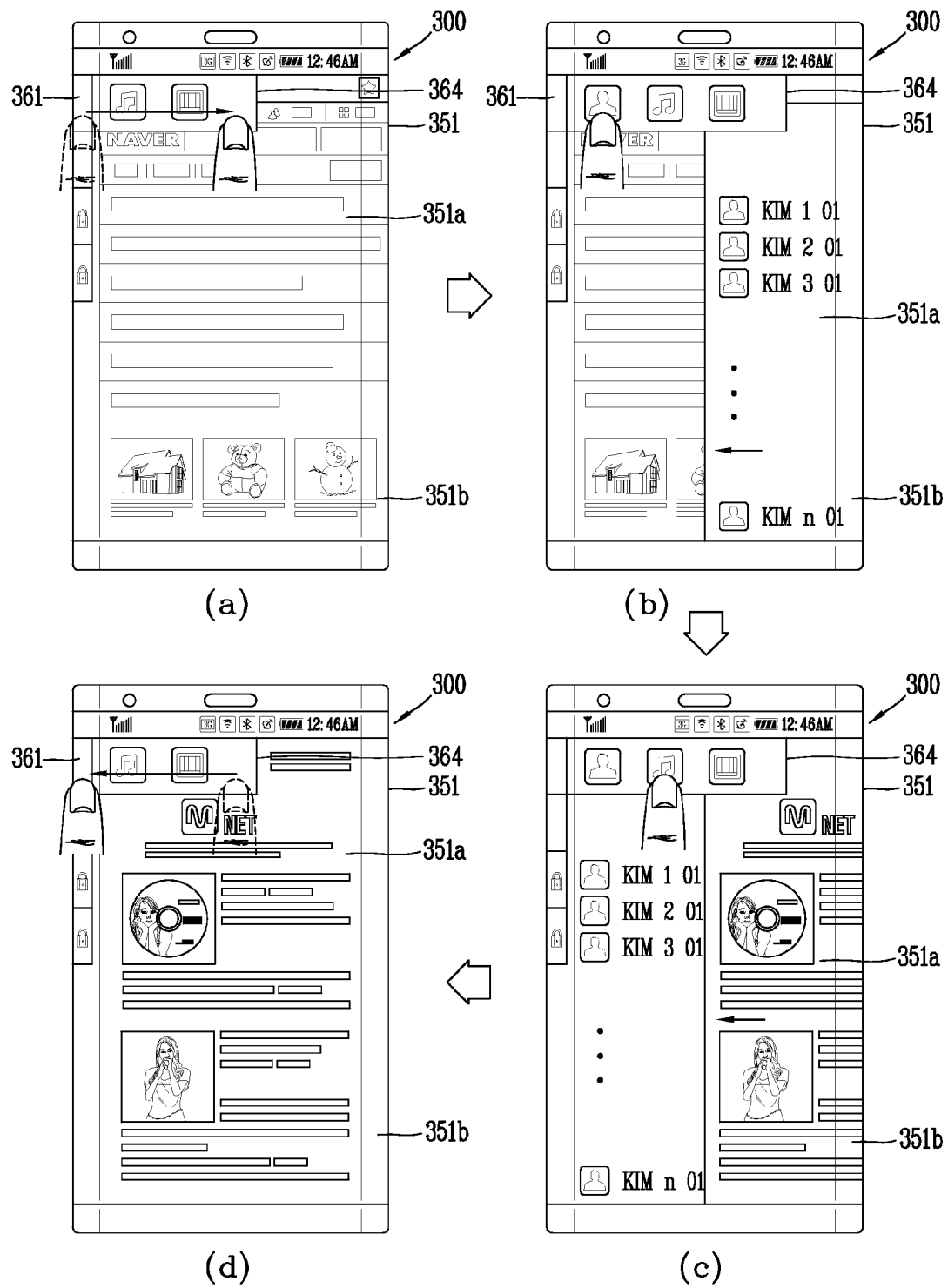
FIGS. 16 and 17 are conceptual views illustrating a control operation of outputting a plurality of applications on a front display unit using a graphic object output on a side display unit.

FIG. 16 is a conceptual view illustrating a control of outputting a plurality of application on the display unit 351 in an alternating manner using the graphic object 361 output on the side display unit.

As illustrated in (a) of FIG. 16, a currently-run application is output on the first area 351a. A web browser screen is currently output on the first area 351e. In response to a touch input applied to the graphic object 361 output on the second area 351b, a select window 364 for selecting one of a plurality of applications is output on the first area 351a.

The plurality of applications output on the select window 364 may be decided by reflecting a frequency of use, a user setting, an already-run application and the like. For example, the plurality of applications may be output on the select window 364 by reflecting statistics of applications which are frequently used in the terminal. In this case, if the frequency of use of the applications changes, types of applications output on the select window 364 may differ.

As illustrated in (b) of FIG. 16, in response to a touch input applied to select one of the plurality of applications from the select window 364, screen information output on the first area 351a is changed from the currently-run application into a newly-selected application. (b) of FIG. 16 illustrates an example that a contact application is currently executed and output on the first area 351a as the user selects the contact application from the select window 364.

As illustrated in (c) of FIG. 16, in response to a touch input applied to select another application from the select window 364, the screen information output on the first area 351a is changed into the newly-selected another application once again. It can be understood that the newly-changed screen information within the first area 351a may be a music playback application according to the user selection.

When the another application is selected from the select window 364, the selected application is executed and output on the first area 351a.

As illustrated in (d) of FIG. 16, when the graphic object 361 is touched again, the select window 364 which is currently output on the first area 351a disappears towards the second area 351b.

In the present disclosure, as can be noticed in (a) to (d) of FIG. 16, even if the screen information output on the first area 351a is changed using the graphic object 361 output on the second area 351b, the output state of the graphic object 361 on the second area 351a may be maintained. Accessibility with respect to the application corresponding to the graphic object 361 can thusly be ensured, resulting in providing the user with convenience in executing the application.

Figure 17:
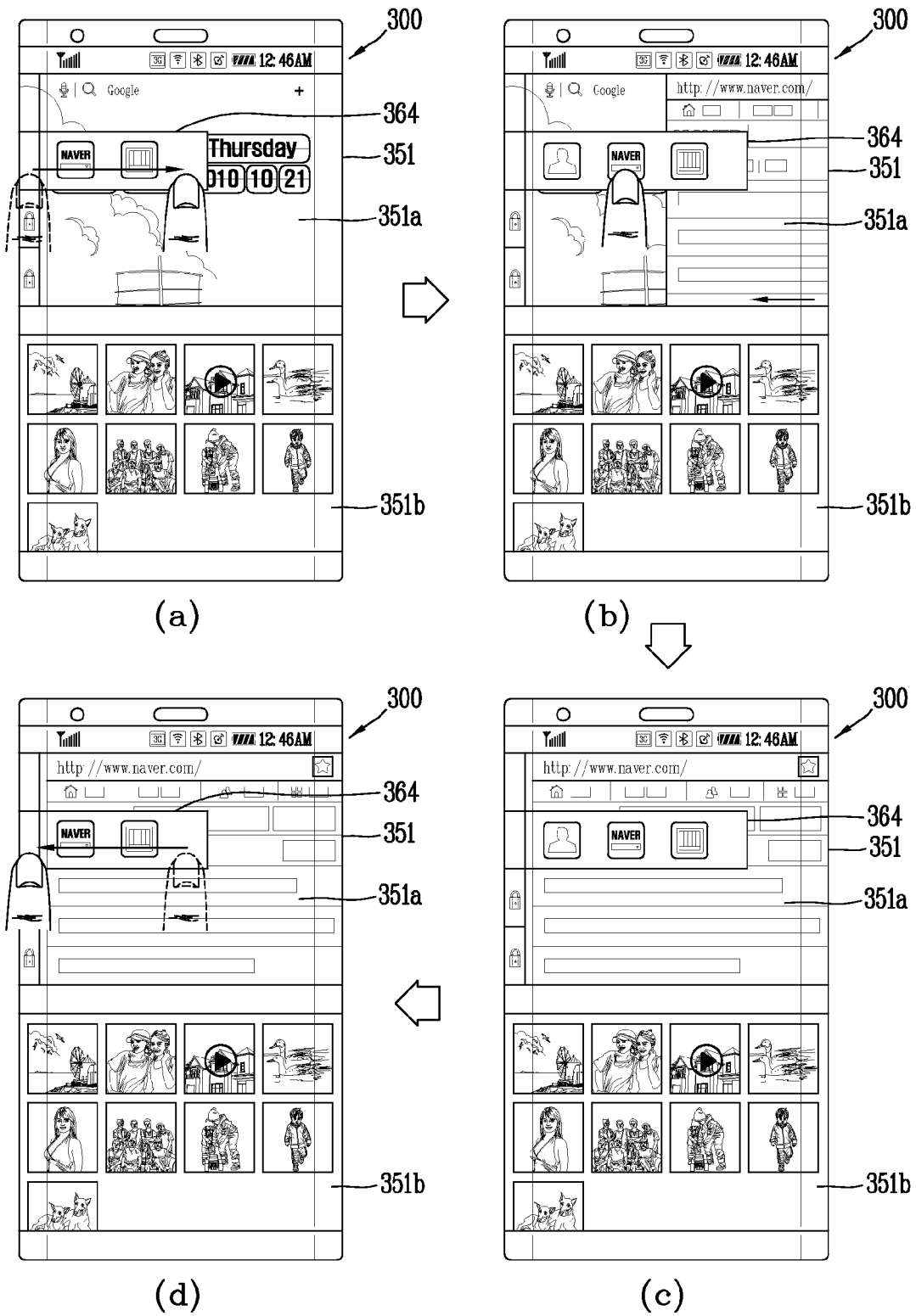

FIG. 17 is a conceptual view illustrating a control of outputting a plurality of applications on different areas of the display unit 351 using the graphic object 361 output on the side display unit.

As illustrated in (a) of FIG. 17, the first area 351a is divided into a plurality of distinctive portions. Different types of applications may be executed and output on the respective portions of the first area 351a. A currently-run application may be output on one of the portions of the first area 351a and a home screen page may be output on another portion. As illustrated, an application which is currently output on one portion of the first area 351a may also be output even on the second area 351b as well as the first area 351a.

In response to a touch input applied to the graphic object 361, a select window 364 for selecting one of the plurality of applications is output on the first area 351a.

As illustrated in (b) of FIG. 17, when a touch input is applied to select one of the plurality of applications, the screen information is changed and the selected application is output on one portion, on which any application has not been output, of the portions of the first area 351a.

As illustrated in (c) of FIG. 17, the application which is output on the first area 351a and the application selected from the select window 364 are all output on the first area 351a. The applications may be output on the plurality of portions of the first area 351a, respectively. The number of divided portions may differ according to a user setting.

Unlike the example illustrated in (c) of FIG. 17, while an application is output on the full first area 351a, when a new application is selected from the select window 364 by touching the graphic object 361 of the second area 351b, the first area 351a may be divided into two portions, such that the already-run application and the newly-selected application can simultaneously be output on the respective divided portions. When another application is further selected from the select window 364, the first area 351a may be divided into a plurality of portions so as to output those applications on the divided portions, respectively.

As illustrated in (d) of FIG. 17, the select window 364 which is output on the first area 351a may disappear from the first area 351a towards the second area 351b by touching the graphic object 361 again. The image which has been output on the first area 351a in response to a touch input applied to the graphic object 361 may disappear in response to the touch applied to the graphic object 361 again.

Hereinafter, description will be given of embodiments in which the graphic object 361 has other functions, in addition to the function of simply executing an application.

Figure 18:
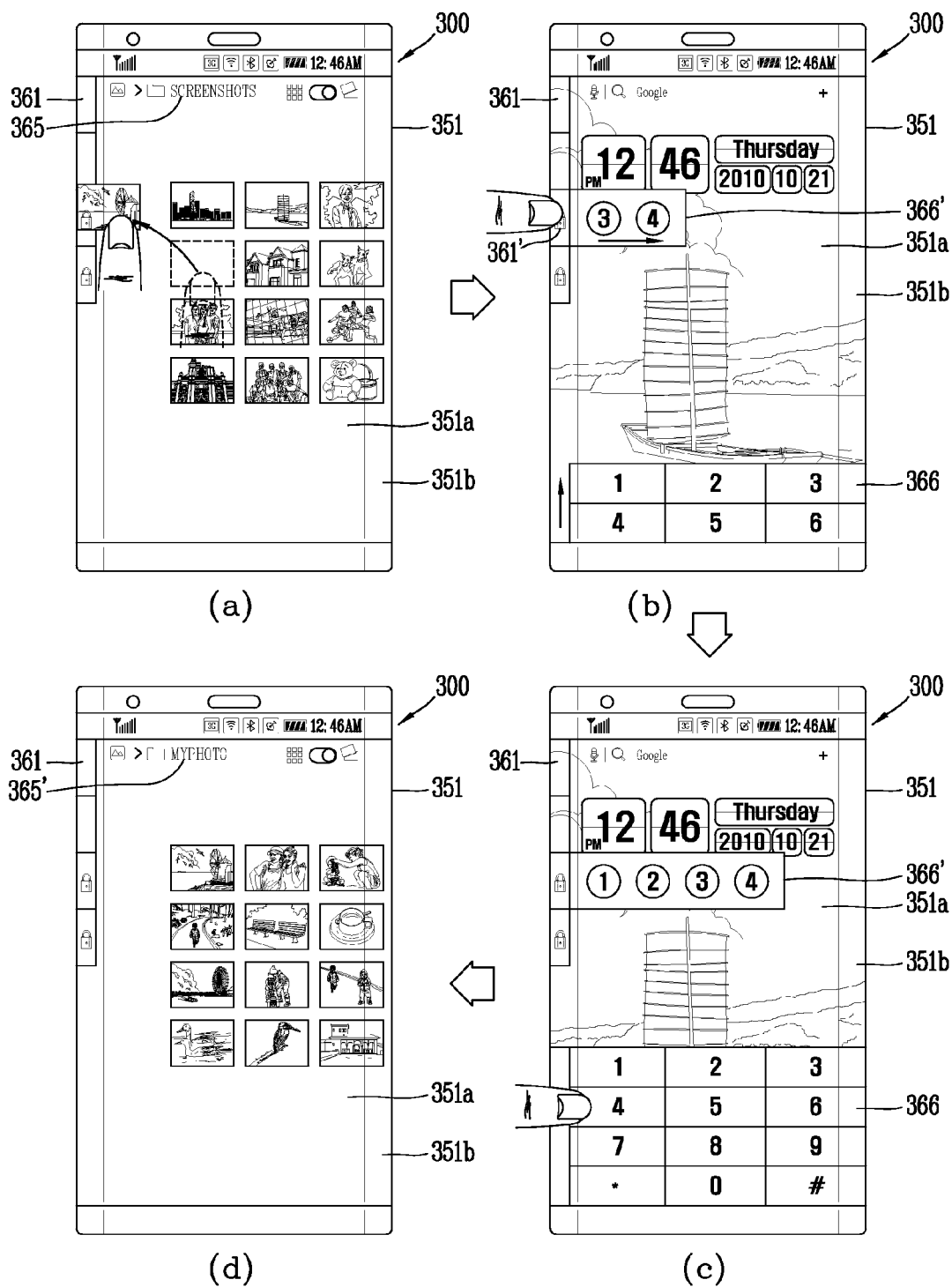
FIGS. 18 to 19B are conceptual views illustrating an exemplary embodiment of accessing an application using a graphic object output on a side display unit.

FIG. 18 is a conceptual view illustrating an exemplary embodiment of using the graphic object 361 output on the side display unit as a concept of a folder.

After applying a touch input of dragging and dropping screen information output on the first area 351a to the graphic object 361 output on the second area 351b, when an application corresponding to the graphic object 361 is activated in response to a touch input applied to the graphic object 361, the screen information is output on the application As illustrated in (a) of FIG. 18, an application of a photo album 365 is activated on the first area 351a. When a touch input of moving one photo to the graphic object 361 through drag & drop, the graphic object 361 corresponds to a new photo album folder 365', which is different from the photo album 365 output on the first area 351a, such that the dragged & dropped photo can be stored in the new photo album folder 365'. A photo stored in the existing photo album 365 may be stored in the new photo album folder 365' in a manner of newly copying the existing photo file into the new photo album folder 365'. The same file may be shared by the respective photo albums 365 and 365'.

As illustrated in (b) of FIG. 18, the graphic object 361 with the touch input applied thereto includes an additional image 361', which indicates that a lock function (or a lock) has been set for an activation of the application. When a touch input is applied to the graphic object 361, an input window 366 for releasing a lock state and an output window 366' for outputting an input applied through the input window 366 are output on the first area 351a, other than the application being immediately executed.

The lock function may be set with respect to the activation of an application through the graphic object 361 or a change of screen information on the first area 351a through the graphic object 361. When the lock function is set for the activation of the application through the graphic object 361, the application corresponding to the graphic object 361 can be executed only by touching the graphic object 361 and then applying an input for releasing the lock state. When the lock function is set for the change of the screen information on the first area 351a, the screen information is not changed even though a touch input is applied to the graphic object 361, but changed only when an input for releasing the lock state is applied.

The graphic object 361 output on the second area 351b provides the terminal user with high accessibility with respect to the application corresponding to the graphic object 361. This may cause a third party except for the terminal user to easily access user information stored in the terminal. Therefore, if the lock function is set for the execution of the application or the change of the screen information on the first area 351a through the graphic object 361, only the user who can release the lock state can be provided with accessibility, and the third party's access can be restricted.

As illustrated in (c) of FIG. 18, a password for releasing the lock function is input through the input window 366 which is output on the first area 351a. As illustrated in (d) of FIG. 18, in response to the release of the lock function, the application corresponding to the graphic object 361 is executed.

The screen information which has been moved to the graphic object 361 through the drag & drop in (a) of FIG. 18 is output on the application as the application corresponding to the graphic object 361 is executed in (d) of FIG. 18. The photo moved to the new photo album folder 365' through of the drag & drop is output on the new photo album folder 365' of the first area 351a.

As illustrated in (a) to (d) of FIG. 18, the graphic object 361 may function as a folder for storing screen information, in addition to the function of executing the application. Also, a lock function can be set such that only a user who is permitted to release the lock function can view the screen information in the folder, namely, the graphic object 361.

Since the output of the graphic object 361 on the second area 351b is maintained, independent of the change of the screen information output on the first area 351a, the user can ensure accessibility with respect to the screen information stored in the graphic object 361.

Hereinafter, another embodiment using the graphic object 361 output on the second area 351b will be described.

Figure 19A:
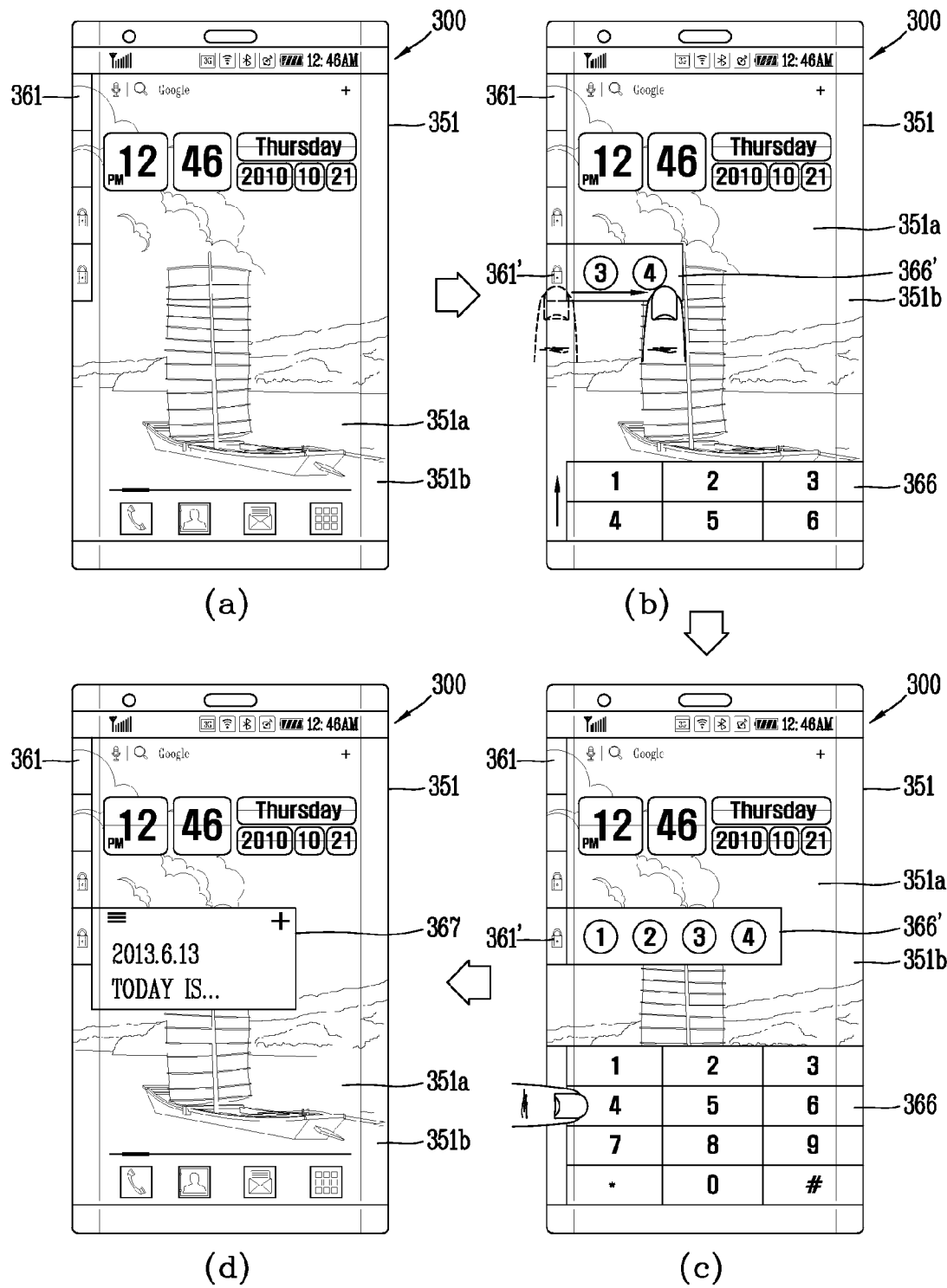

FIG. 19A is a conceptual view illustrating an embodiment of accessing an application using the graphic object 361 output on the side display unit.

As illustrated in (a) of FIG. 19A, a home screen page is output on the first area 351a, and the graphic object 361 corresponding to an application is output on the second area 351b.

As illustrated in (b) of FIG. 19A, when a touch input is applied to the graphic object 361, an input window 366 for releasing a lock function and an output window 366' for outputting an input applied through the input window 366 is output on the first area 351a.

In response to an input of a password for releasing the lock function in (c) of FIG. 19A, the application corresponding to the graphic object 361 is executed in (d) of FIG. 19A. The executed application which is a memo application in (d) of FIG. 19A outputs a memo 367 previously-stored by the user. Accordingly, the user may modify or delete the memo 367 or add a new memo.

The present disclosure can ensure accessibility with respect to the application corresponding to the graphic object 361, which may result in providing much high usability with respect to an application in which a simple message, such as the memo 367, has to be quickly stored.

Figure 19B:
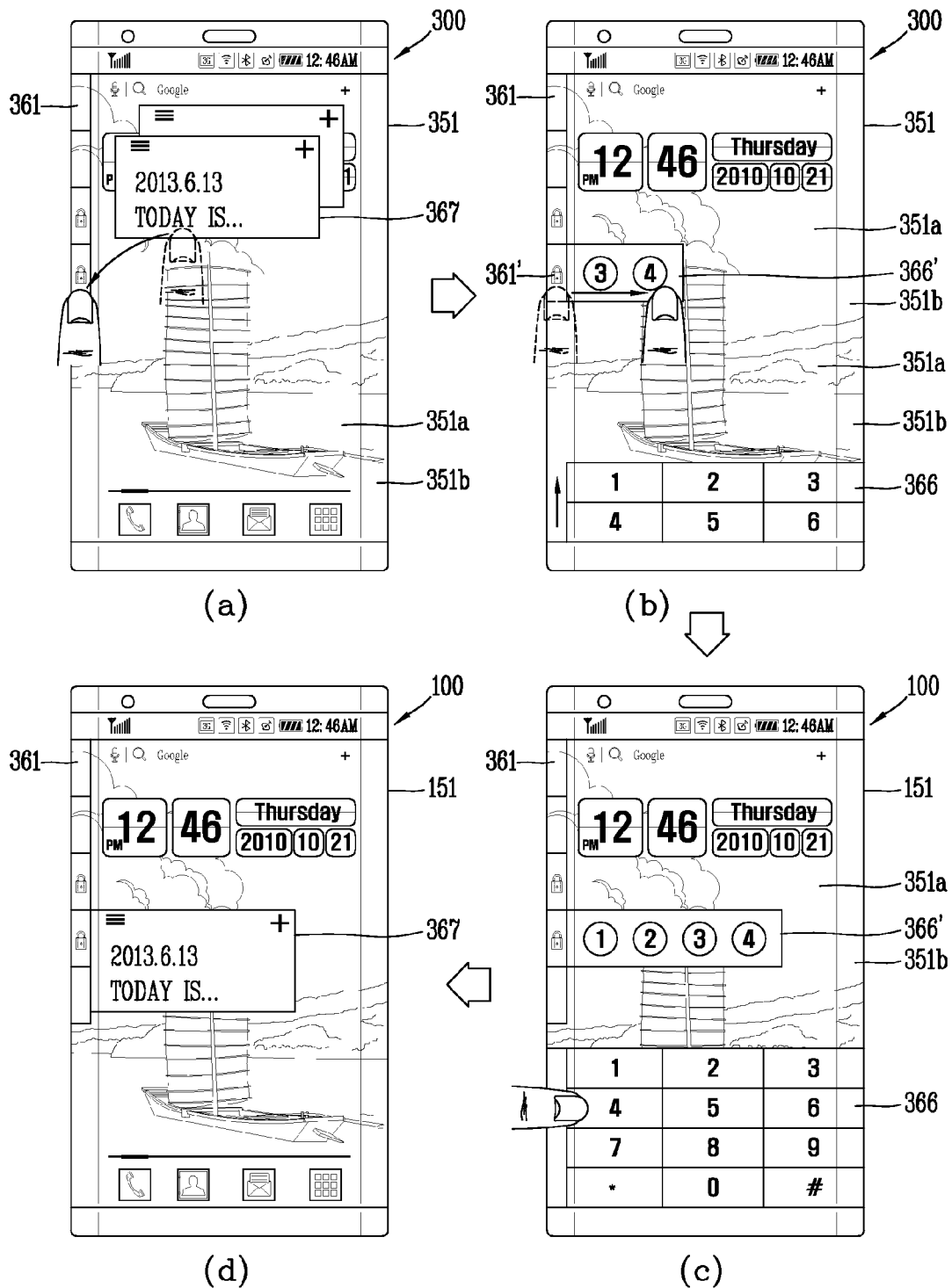

FIG. 19B is a conceptual view illustrating an embodiment using the graphic object 361 output on the side display unit 351 as a concept of a memo folder.

As illustrated in (a) of FIG. 19B, screen information related to the memo 367 is output on the first area 351a. The screen information related to the memo output on the first area 351a is moved to the graphic object 361 through drag & touch, so as to be stored in the graphic object 361 corresponding to the folder.

As illustrated in (b) of FIG. 19B, in response to a touch input applied to the graphic object 361, an input window 366 for releasing a lock function 361' set for an activation of an application is output.

As illustrated in (c) of FIG. 19B, a password is input through the input window 366 for releasing the lock function so as to release a lock state.

As illustrated in (d) of FIG. 19B, the memo application is activated in the first area 351a so as to open a memo 367 stored in the graphic object 361 as the folder.

As described above, in a control apparatus for a mobile terminal and a control method thereof according to exemplary embodiments disclosed herein, while the mobile terminal is gripped by a user, indication information may not be displayed on a main display but be displayed on a first or second sub display, such that the user can check the indication information through the first or second sub display in a fast, convenient manner.

In a control apparatus for a mobile terminal and a control method thereof according to exemplary embodiments disclosed herein, while a mobile terminal is gripped by a user, indication information may be displayed on a sub display (for example, a sub display receiving a touch input applied by the user's thumb) with the less number of user touch inputs (i.e., currently having a wider display are for displaying the indication information) according to the gripped state. This may facilitate the user to check the indication information in a convenient manner.

In a control apparatus for a mobile terminal and a control method thereof according to exemplary embodiments disclosed herein, while a mobile terminal is gripped by a user, a user direction may be detected and indication information may be displayed on a sub display corresponding to the detected user direction. This may facilitate the user to conveniently check the indication information through the sub display corresponding to a direction that the user is located.

In a control apparatus for a mobile terminal and a control method thereof according to exemplary embodiments disclosed herein, when indication information or an icon displayed on a first or second sub display is dragged and dropped to a main display, detailed information corresponding to the indication information or icon may be displayed on the main display. This may facilitate the user to check the indication information or icon through the sub display in a convenient manner, and also check the detailed information corresponding to the indication information or icon through the main display in a fast, convenient manner.

In a control apparatus for a mobile terminal and a control method thereof according to exemplary embodiments disclosed herein, a graphic object corresponding to an application may be continuously output on a side display unit, independent of a change of screen information output on a front display unit. This may provide the user with accessibility capable of conveniently executing the application.

In a control apparatus for a mobile terminal and a control method thereof according to exemplary embodiments disclosed herein, a graphic object output on a side display unit and an application corresponding to the graphic object may be set by a user input, thereby providing user convenience.

In a control apparatus for a mobile terminal and a control method thereof according to exemplary embodiments disclosed herein, front and side display units may operate cooperative with each other, thereby providing a new type of user convenience.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A control apparatus for a mobile terminal, the apparatus comprising:
    a main display that is located on a front surface of the mobile terminal;
    a first sub display that extends from the main display and is located on a left side of the mobile terminal;
    a second sub display that extends from the main display and is located on a right side of the mobile terminal;
    a communication unit; and
    a controller operably coupled with the main display, the first sub display, the second sub display, and the communication unit and configured to:
        generate indication information indicating event information received via the communication unit; and
        cause displaying of the indication information on the first or second sub display, the indication information not displayed on the main display, while the mobile terminal is gripped by a user,
    wherein the indication information is displayed on the first sub display when a first number of touch inputs received via the first sub display is less than a second number of touch inputs received via the second sub display, the touch inputs received via the first sub display and the second sub display while the mobile terminal is gripped by the user, and
    wherein a first display area of the first sub display is wider than a second display area of the second sub display when the first number of touch inputs is less than the second number of touch inputs, and the indication information is displayed on the first display area of the first sub display while the mobile terminal is gripped by the user.

2. The control apparatus of claim 1, wherein the controller is further configured to cause the second sub display to display the indication information when the second number is less than the first number.

3. The control apparatus of claim 1, wherein the controller is further configured to cause displaying of the indication information on the first or second sub display according to a posture of the mobile terminal.

4. The control apparatus of claim 1, wherein the controller is further configured to cause displaying of the indication information on the first or second sub display when the main display faces a direction of gravity.

5. The control apparatus of claim 1, wherein the controller is further configured to:
    detect a user direction while the mobile terminal is gripped; and
    cause the first sub display to display the indication information when a direction of the first sub display and the detected user direction are matched.

6. The control apparatus of claim 5, further comprising:
    a first directional microphone that is configured to receive a first sound received in a direction of the first sub display; and
    a second directional microphone that is configured to receive a second sound received in a direction of the second sub display,
    wherein the controller is further configured to:
        cause displaying of the indication information on the first sub display by recognizing that the user is located in the direction of the first sub display when a preset user voice is recognized from the first sound of the first and second sounds, and
        cause displaying of the indication information on the second sub display by recognizing that the user is located in the direction of the second sub display when the preset user voice is recognized from the second sound of the first and second sounds.

7. The control apparatus of claim 1, wherein the controller is further configured to cause displaying of the event information corresponding to the indication information on the main display when the indication information displayed on the first or second sub display is dragged into the main display.

8. The control apparatus of claim 1, wherein the controller is further configured to:
    cause displaying of contents on the main display;
    cause displaying of icons indicating application programs for processing the contents on the first or second sub display; and
    execute an application program corresponding to one of the icons to process the contents when the contents are moved to the one icon through drag and drop.

9. The control apparatus of claim 1, wherein the controller is further configured to:
    cause displaying of contents on the main display;
    cause displaying of a first icon indicating an application program for processing the contents on the first sub display;

cause displaying of a second icon for transmitting the contents to a preset recipient on the second sub display; and cause transmission of the contents to the recipient corresponding to the second icon through an application program cooperative with the second icon when the contents are moved to the second icon through drag and drop.

10. The control apparatus of claim 1, wherein the controller is further configured to:

cause displaying of a graphic object corresponding to one application on the first and second sub displays; and execute the application corresponding to the graphic object when the graphic object is selected, wherein an execution screen of the application is displayed on the main display, and a display state of the graphic object on the first and second sub displays is maintained, independent of the execution screen displayed on the main display.

11. The control apparatus of claim 10, wherein the graphic object corresponds to a plurality of applications, and wherein the controller is further configured to cause displaying of a select window on the main display when the graphic object is selected, the select window configured to select an application to be displayed on the main display from the plurality of applications.

12. The control apparatus of claim 10, wherein the main display is divided into a plurality of distinctive portions, and wherein the controller is further configured to cause displaying of an application corresponding to the graphic object on a portion without the application displayed, among the plurality of portions when the graphic object is selected.

13. The control apparatus of claim 10, wherein the controller is further configured to:

cause the main display to display an application corresponding to the graphic object based on a touch input applied to the graphic object; and thereafter cause re-displaying of a screen before the application is executed on the main display when a touch input is applied to the graphic object again.

14. The control apparatus of claim 10, wherein each of the first and second sub displays is divided into a plurality of distinctive portions, and wherein the controller is further configured to cause displaying of graphic objects corresponding to different types of applications on a respectively corresponding portion of the plurality of portions.

15. The control apparatus of claim 14, wherein the controller is further configured to:

cause displaying of at least one shortcut icon corresponding to the application;

cause displaying of a graphic object corresponding to the application on the first or second sub display when the shortcut icon is moved from the main display to the first or second sub display through drag and drop; and cause removal of the graphic object displayed on the first or second sub display when the graphic object displayed on the first or second sub display is moved from the first or second sub display to the main display through drag and drop.

16. The control apparatus of claim 10, wherein the controller is further configured to:

set a lock function for an activation of the application based on a user input; and execute the application when a user input for releasing the lock function is applied after the graphic object is touched.

17. The control apparatus of claim 10, wherein the controller is further configured to:

set a lock function for a change of a screen displayed on the main display based on a user input; and execute the change of the screen displayed on the main display when a user input for releasing the lock function is applied after the graphic object is touched.

18. A control method for a mobile terminal comprising a main display that is located on a front surface of the mobile terminal, a first sub display that extends from the main display and is located on a left side of the mobile terminal, and a second sub display that extends from the main display and is located on a right side of the mobile terminal, the method comprising:

receiving event information through a wireless communication network;

generating indication information indicating that the event information has been received; and displaying the indication information on the first or second sub display, the indication information not displayed on the main display, while the mobile terminal is gripped by a user, wherein the indication information is displayed on the first sub display when a first number of touch inputs received via the first sub display is less than a second number of touch inputs received via the second sub display, the touch inputs received via the first sub display and the second sub display while the mobile terminal is gripped by the user, and wherein a first display area of the first sub display is wider than a second display area of the second sub display when the first number of touch inputs is less than the second number of touch inputs, and the indication information is displayed on the first display area of the first sub display while the mobile terminal is gripped by the user.

19. The method of claim 18, further comprising:

displaying a graphic object corresponding to at least one application on the first and second sub displays;

executing the application corresponding to the graphic object when the graphic object is selected;

displaying an execution screen of the application on the main display; and maintaining a display state of the graphic object on the first and the second sub displays, independent of the execution screen displayed on the main display.

* * * * *